United States Patent
Danielson et al.

(10) Patent No.: US 10,818,137 B1
(45) Date of Patent: Oct. 27, 2020

(54) SYSTEM, DEVICE, AND METHOD TO MANAGE ELECTRONIC RECORDS FOR DIGITAL TICKETS

(71) Applicant: IGT, Las Vegas, NV (US)

(72) Inventors: Patrick Danielson, Las Vegas, NV (US); Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 16/408,550

(22) Filed: May 10, 2019

(51) Int. Cl.
*G06Q 50/34* (2012.01)
*G06Q 30/00* (2012.01)
*G06Q 20/04* (2012.01)
*G07F 17/32* (2006.01)

(52) U.S. Cl.
CPC ....... *G07F 17/3244* (2013.01); *G06Q 20/045* (2013.01); *G06Q 30/0185* (2013.01); *G06Q 50/34* (2013.01); *G07F 17/3288* (2013.01); *G07F 17/3241* (2013.01)

(58) Field of Classification Search
None
See application file for complete search history.

(56) References Cited

U.S. PATENT DOCUMENTS

2019/0213832 A1* 7/2019 Tsutsui .............. G06Q 20/3278
2020/0043296 A1* 2/2020 Joao .................... G07F 17/3234

* cited by examiner

*Primary Examiner* — James S. McClellan
*Assistant Examiner* — Peter J Iannuzzi
(74) *Attorney, Agent, or Firm* — Sheridan Ross P.C.

(57) ABSTRACT

A method, system, and device for managing electronic records is provided. As an example, a method is provided that comprises receiving a message that comprises a data payload, where the data payload comprises a physical ticket identification (PID) number representing a substantially unique identifier assigned to a physical ticket, a timestamp associated with a time at which the physical ticket was produced, an event identification (EID) number representing an event on which a wager has been placed, and a wager description field that describes both a wager type and a wager amount associated with the wager. The method further comprises comparing the PID number with an electronic record comprising a list of PID numbers already stored in memory, and causing the data payload to be stored in memory in response to determining that the electronic record comprising the list of PID numbers does not comprise the PID number.

20 Claims, 12 Drawing Sheets

Fig. 2B

| PID Number | | |
|---|---|---|
| Wager 1 | Issued Date/Time | Wager Amount |
| | EID Number | Wager Type |
| Wager 2 | Issued Date/Time | Wager Amount |
| | EID Number | Wager Type |
| Wager 3 | Issued Date/Time | Wager Amount |
| | EID Number | Wager Type |

Fig. 2C

| PID Number | | |
|---|---|---|
| Wager 1 | Issued Date/Time | Wager Amount |
| | Wager Type | EID 1 |
| | EID 2 | EID 3 |
| | EID 4 | EID 5 |
| | EID 6 | EID 7 |
| | EID 8 | EID 9 |

SYSTEM, DEVICE, AND METHOD TO MANAGE ELECTRONIC RECORDS FOR DIGITAL TICKETS

BACKGROUND

The present disclosure is generally directed toward managing electronic records for digital tickets.

Today a ticket or voucher, in the parlance of the Gaming Standards Association, represents an amount of money that is cashed out from a machine. At the time of cash out, the amount of money on a gaming machine's credit meter is zeroed out and a voucher is issued or printed from the machine representing the amount of money that was on the credit meter at the time of zeroing. Printed on the ticket is a barcode and often other information such as the date, the amount of money represented by the ticket, and information identifying the property and the gaming machine where it was printed. A back-end system is used to facilitate ticket functionality such that an electronic copy of the ticket is stored in the back-end system when the ticket is issued by the gaming machine. Tickets/vouchers allow patrons at a casino to easily move money between machines and to change tickets/vouchers to cash using a cashier or kiosk. When printed or issued, the ticket state is unpaid and is, essentially, a bearer bond for the patron holding the ticket. The unpaid ticket can be inserted into the bill acceptor of a gaming machine and, via interactions with the back-end system, the ticket can be used to transfer the amount of money represented by the ticket, to the gaming machine's credit meter. Once the money is transferred to the gaming machine's credit meter, the ticket is marked as paid in the back-end system so that it cannot be paid more than once.

BRIEF SUMMARY

In some embodiments, a method of storing and managing digital records is provided that includes: receiving, at a processor, a message that includes a data payload, where the data payload includes a physical ticket identification (PID) number representing a substantially unique identifier assigned to a physical ticket, a timestamp associated with a time at which the physical ticket was produced, an event identification (EID) number representing an event on which a wager has been placed, and a wager description field that describes both a wager type and a wager amount associated with the wager; comparing, with the processor, the PID number with an electronic record including a list of PID numbers already stored in memory; determining, with the processor, that the electronic record including the list of PID numbers does not include the PID number; in response to determining that the electronic record including the list of PID numbers does not include the PID number, causing, with the processor, the data payload to be stored in the memory; updating, with the processor, the electronic record including the list of PID numbers to include the PID number; receiving, at the processor, an event notification message that comprises an EID field; comparing, with the processor, a value obtained from the EID field with the EID number stored in memory as part of the data payload; determining, with the processor, that the value obtained from the EID field matches the EID number stored in memory; and in response to determining that the value obtained from the EID field matches the EID number stored in memory, providing, with the processor, a wager notification message to a wager redemption terminal, where the wager notification message includes the PID number, the timestamp, the EID number, the wager type associated with the wager, and the wager amount associated with the wager.

In some embodiments, a system for storing digital records is provided that includes: a communication interface; a processor coupled with the communication interface; and a computer-readable storage medium, coupled with the processor, including instructions that are executable by the processor, where the instructions include: instructions that receive, via the communication interface, a message that includes a data payload, where the data payload includes a physical ticket identification (PID) number representing a substantially unique identifier assigned to a physical ticket, a timestamp associated with a time at which the physical ticket was produced, an event identification (EID) number representing an event on which a wager has been placed, a wager type associated with the wager, and a wager amount associated with the wager; instructions that compare the PID number with an electronic record including a list of PID numbers representing physical tickets already stored for a user that placed the wager; instructions that determine whether the electronic record comprising the list of PID numbers includes the PID number; instructions that update the electronic record including the list of PID numbers to include the PID number; instructions that receive, via the communication interface, an event notification message that includes an EID field; instructions that extract a value from the EID field; instructions that compare the value extracted from the EID field with the EID number and determine the value extracted from the EID field matches the EID number; and instructions that generate and send, via the communication interface, a wager notification message to a wager redemption terminal in response to determining that the value extracted from the EID field matches the EID number, where the wager notification message comprises the PID number, the timestamp, the EID number, the wager type associated with the wager, and the wager amount associated with the wager.

In some embodiments, a mobile communication device is provided that includes: an image capture device; a communication interface; a processor coupled with the image capture device and with the communication interface; and a computer-readable storage medium, coupled with the processor, including instructions that are executable by the processor, where the instructions include: instructions that receive an image of a physical ticket from the image capture device; instructions that analyze the image of the physical ticket to determine a data payload for the physical ticket, wherein the data payload comprises a physical ticket identification (PID) number representing a substantially unique identifier assigned to a physical ticket, a timestamp associated with a time at which the physical ticket was produced, an event identification (EID) number representing an event on which a wager has been placed, a wager type associated with the wager, and a wager amount associated with the wager; instructions that compare the PID number with an electronic record comprising a list of PID numbers representing physical tickets already stored for a user of the mobile communication device; instructions that determine whether the electronic record including the list of PID numbers includes the PID number; instructions that update the electronic record comprising the list of PID numbers to include the PID number; instructions that receive, via the communication interface, an event notification message that comprises an EID field; instructions that extract a value from the EID field; instructions that compare the value extracted from the EID field with the EID number and determine the value extracted from the EID field matches the EID number;

and instructions that generate and send, via the communication interface, a wager notification message to a wager redemption terminal in response to determining that the value extracted from the EID field matches the EID number, wherein the wager notification message comprises the PID number, the timestamp, the EID number, the wager type associated with the wager, and the wager amount associated with the wager.

Additional features and advantages are described herein and will be apparent from the following Description and the figures.

BRIEF DESCRIPTION OF THE SEVERAL VIEWS OF THE DRAWINGS

FIG. 2B is a block diagram depicting a first illustrative format of the data structure in accordance with embodiments of the present disclosure;

FIG. 2C is a block diagram depicting a second illustrative format of the data structure in accordance with embodiments of the present disclosure;

DETAILED DESCRIPTION

Figure 1:
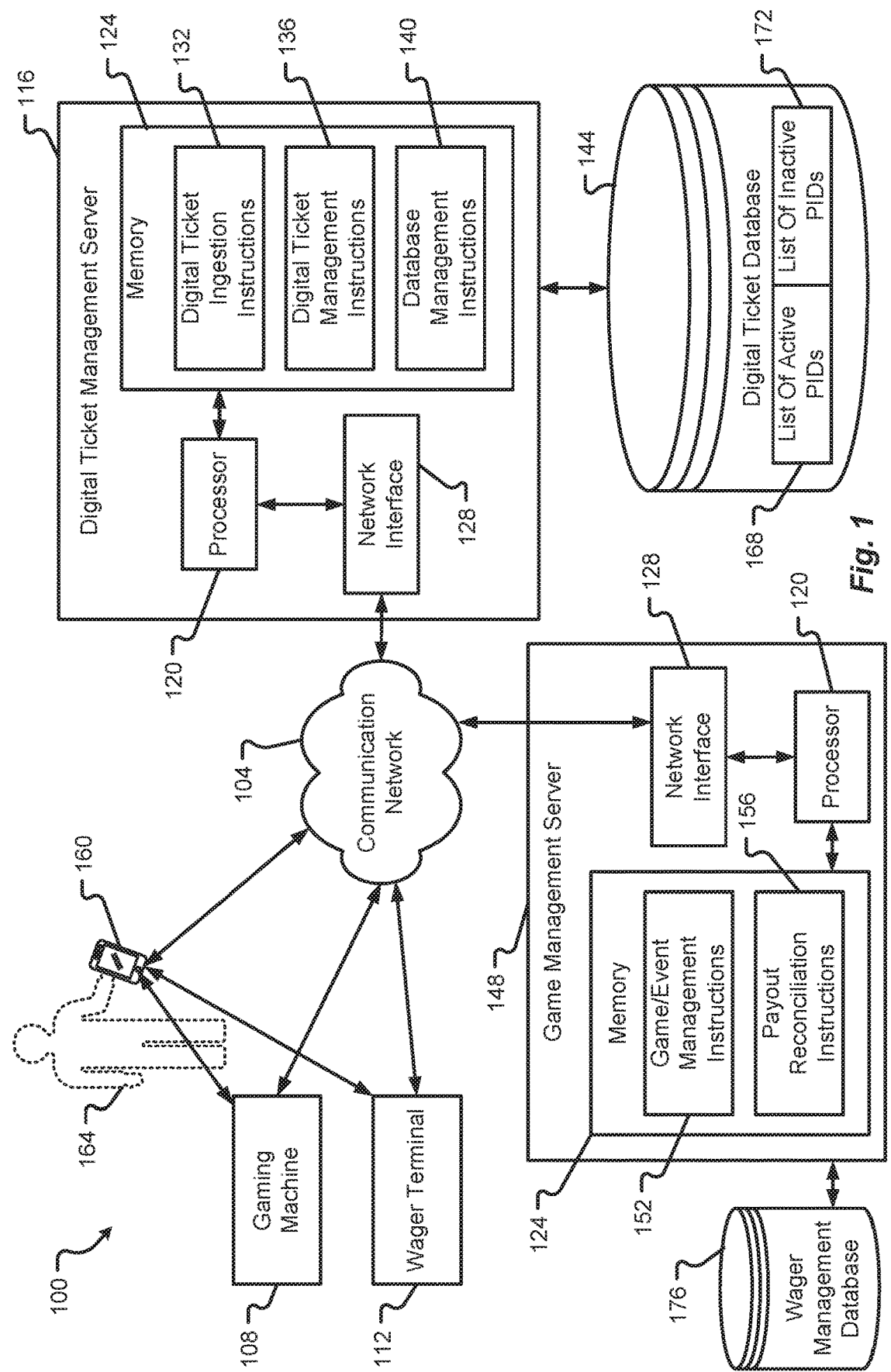
FIG. 1 is a block diagram of a gaming system accordance with embodiments of the present disclosure.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an Electronic Gaming Machine (EGM) as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts. A "gaming device" as used herein may be understood to include an EGM, multiple EGMs, a personal gaming device, multiple personal gaming devices, a mobile device, multiple mobile devices, a wager terminal, multiple wager terminals, or combinations thereof.

As noted above, in various embodiments, the gaming system includes a gaming device in combination with a central server, central controller, or remote host. In such embodiments, the EGM (or gaming device) is configured to communicate with the central server, central controller, or remote host through a data network or remote communication link. In certain such embodiments, the EGM (or gaming device) is configured to communicate with another EGM (or gaming device) through the same data network or remote communication link or through a different data network or remote communication link. For example, the gaming system includes a plurality of gaming devices that are each configured to communicate with a central server, central controller, or remote host through a data network.

In certain embodiments in which the gaming system includes a gaming device in combination with a central server, central controller, or remote host, the central server, central controller, or remote host is any suitable computing device (such as a server) that includes at least one processor and at least one memory device or data storage device. As further described herein, the EGM (or gaming device) includes at least one EGM (or gaming device) processor configured to transmit and receive data or signals representing events, messages, commands, or any other suitable information between the EGM (or gaming device) and the central server, central controller, or remote host. The at least one processor of that EGM (or gaming device) is configured to execute the events, messages, or commands represented by such data or signals in conjunction with the operation of the EGM (or gaming device). Moreover, the at least one processor of the central server, central controller, or remote host is configured to transmit and receive data or signals representing events, messages, commands, or any other suitable information between the central server, central controller, or remote host and the EGM (or gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or gaming device). Further, one, more than one, or each of the functions of the at least one processor of the EGM (or gaming device) may be performed by the at least one processor of the central server, central controller, or remote host.

In certain such embodiments, computerized instructions for controlling any games (such as any primary or base games and/or any secondary or bonus games) displayed by the EGM (or gaming device) are executed by the central server, central controller, or remote host. In such "thin client" embodiments, the central server, central controller, or remote host remotely controls any games (or other suitable interfaces) displayed by the EGM (or gaming device), and the EGM (or gaming device) is utilized to display such games (or suitable interfaces) and to receive one or more inputs or commands. In other such embodiments, computerized instructions for controlling any games displayed by the EGM (or gaming device) are communicated from the central server, central controller, or remote host to the EGM (or gaming device) and are stored in at least one memory device of the EGM (or gaming device). In such "thick client" embodiments, the at least one processor of the EGM (or gaming device) executes the computerized instructions to control any games (or other suitable interfaces) displayed by the EGM (or gaming device).

In various embodiments in which the gaming system includes a plurality of EGMs (or gaming devices), one or more of the EGMs (or gaming devices) are thin client EGMs (or gaming devices) and one or more of the EGMs (or gaming devices) are thick client EGMs (or gaming devices). In other embodiments in which the gaming system includes one or more EGMs (or gaming devices), certain functions of one or more of the EGMs (or gaming devices) are implemented in a thin client environment, and certain other functions of one or more of the EGMs (or gaming devices) are implemented in a thick client environment. In one such embodiment in which the gaming system includes an EGM (or gaming device) and a central server, central controller, or remote host, computerized instructions for controlling any primary or base games displayed by the EGM (or gaming device) are communicated from the central server, central controller, or remote host to the EGM (or gaming device) in a thick client configuration, and computerized instructions for controlling any secondary or bonus games or other functions displayed by the EGM (or gaming device) are executed by the central server, central controller, or remote host in a thin client configuration.

In certain embodiments in which the gaming system includes: (a) an EGM (or gaming device) configured to communicate with a central server, central controller, or remote host through a data network; and/or (b) a plurality of EGMs (or gaming devices) configured to communicate with one another through a communication network, the communication network may include a local area network (LAN) in which the EGMs (or gaming devices) are located substantially proximate to one another and/or the central server, central controller, or remote host. In one example, the EGMs (or gaming devices) and the central server, central controller, or remote host are located in a gaming establishment or a portion of a gaming establishment.

In other embodiments in which the gaming system includes: (a) an EGM (or gaming device) configured to communicate with a central server, central controller, or remote host through a data network; and/or (b) a plurality of EGMs (or gaming devices) configured to communicate with one another through a communication network, the communication network may include a wide area network (WAN) in which one or more of the EGMs (or gaming devices) are not necessarily located substantially proximate to another one of the EGMs (or gaming devices) and/or the central server, central controller, or remote host. For example, one or more of the EGMs (or gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or gaming devices) are located. In certain embodiments in which the communication network includes a WAN, the gaming system includes a central server, central controller, or remote host and an EGM (or gaming device) each located in a different gaming establishment in a same geographic area, such as a same city or a same state. Gaming systems in which the communication network includes a WAN are substantially identical to gaming systems in which the communication network includes a LAN, though the quantity of EGMs (or gaming devices) in such gaming systems may vary relative to one another.

In further embodiments in which the gaming system includes: (a) an EGM (or gaming device) configured to communicate with a central server, central controller, or remote host through a data network; and/or (b) a plurality of EGMs (or gaming devices) configured to communicate with one another through a communication network, the communication network may include an internet (such as the Internet) or an intranet. In certain such embodiments, an Internet browser of the EGM (or gaming device) is usable to access an Internet game page from any location where an Internet connection is available. In one such embodiment, after the EGM (or gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or gaming device). Examples of implementations of Internet-based gaming are further described in U.S. Pat. No. 8,764,566, entitled "Internet Remote Game Server," and U.S. Pat. No. 8,147,334, entitled "Universal Game Server".

The central server, central controller, or remote host and the EGM (or gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Embodiments of the present disclosure will be described in connection with a gaming system having one or multiple user devices that enable gaming activity. While certain embodiments of the present disclosure will reference the use of gaming device, which may include an Electronic Gaming Machine (EGM), a Video Gaming Machine (VGM), a wager terminal, and/or a mobile device as a device that enables users to participate in wagering activity, it should be appreciated that embodiments of the present disclosure are not so limited. For instance, any computing device, personal gaming machine, or collection of computing devices may be used as a gaming device to facilitate player engagement with a wagering server.

Embodiments of the present disclosure provide methods to transfer, or back up, sports bet tickets from a gaming device such as a sports betting terminal, kiosk, or EGM to a mobile device. When a user anonymously wagers at a sports wagering terminal or other type of gaming device a physical paper ticket may be printed with various information including a bar code that represents a unique identifier for the ticket. In some embodiments, the mobile device may be configured to organize the data printed on the physical paper ticket, send notifications when the sporting events where wagers are present and complete, and offer validation techniques to eliminate the need to carry and keep track of physical paper tickets for sport betting events. Embodiments of the present disclosure provide security and convenience to the sports wagering ticket experience.

Technical benefits offered by the present disclosure include, without limitation, anonymous sports betting ticketing and tracking, stored locally on the mobile device if desired; logged user account interconnectivity; automated notifications when sports wagers are final; organization of all the sports bets (e.g., date, game, or team); full useable version of redeemable ticket on mobile device, where allowed; and an electronic backup of a physical paper ticket.

In some embodiments, where the ticket corresponds to a sports wagering ticket, the sports wagering ticket may be provided with a unique number assigned by the sports wagering server. When a user scans a ticket with an image capture device of their mobile device, then an application operating on the mobile device may be configured to store the unique number from the ticket, among other things. In some embodiments, at any time the application operating on the mobile device can query the sports wagering server for information about the sports wagers including the date and time the wager was made, the events on which the user is wagering, the amounts of the wagers, and the results of the event, if known.

In one embodiment the application operating on the mobile device can be configured to query the sports wager system for the information once and then store everything on the application to avoid querying the sports wagering server in the future. Synchronization techniques can also be utilized between the application operating on the mobile device and the wagering server so that multiple electronic tickets are not stored at either location, which would otherwise result in a waste of data storage resources and possibly inadvertent double payments to the user in the event of a wager win.

In use, the application may be configured to scan the ticket and the user does not necessarily need to provide a user account or name. This effectively allows the user to anonymously place wagers on different sporting events.

In one non-limiting example, consider a player (e.g., Jacob) that goes to a gaming device (e.g., an EGM) and places a sports wager. When the wager is complete, the screen of the EGM may display a prompt asking if Jacob wants a virtual ticket on his mobile device, or if he wants a printed paper ticket. Jacob may decide to use his mobile device to scan the ticket. He takes his phone out and scans the data on the screen to transfer a digital ticket with all bets onto his mobile device. When the event is complete, a notification is sent to his device about a win (or loss). In response to a positive notification, Jacob may go back to the casino booth and uses his phone to scan the ticket and receive payment from a wagering terminal or from a sports desk in the casino.

In another non-limiting example, a player (e.g., Susan) places multiple sports wagers at a casino and goes home with six physical tickets. That evening, Susan uses her mobile device to scan and store the paper tickets, along with a few others from a previous visit. At the end and completion of each sports event, the mobile device notifies Susan of the game results. After the last event, the mobile device notifies her that no more upcoming events are scheduled and gives her the status of all wins and losses. Susan may then go into a local casino and redeem all of her winning bets by presenting her mobile device to a wagering terminal. To redeem a sports wagering ticket, the ticket is scanned to read a bar that represents the unique ticket. In one embodiment, the application operating on the mobile device displays the sports wagering tickets just like the scanned tickets. This allows the screen of the mobile device to be scanned just like the physical tickets. In one embodiment, the unique identifier for the sports wagering ticket (e.g., a unique Physical Ticket Identification (PID) number) is transferred wirelessly to the wager terminal at the sports desk to be redeemed.

In another embodiment, a player (e.g., Tom) is on a trip to Las Vegas and scans all of his physical paper tickets for his sports bets into his mobile device. When he returns home, he finds out that one of his bets is a winner. Since Tom is not at the location where he placed the bets, Tom opts to redeem the sports bet ticket through his device and receive payment via a mobile payment application or other digital wallet solution, thereby enabling Tom to have the funds directly deposited to his account.

In another embodiment, a player likes to make multiple sports bets and values her privacy because she doesn't want her employer to know she likes to gamble. She scans in all of her sports bet tickets into her mobile device and uses only the notification and organization features provided by the application operating on the mobile device. Since she prefers to still use physical paper tickets, the mobile device will let her know that she has a winning ticket and to take it into the casino to manually redeem.

In one embodiment, when the sports wagering ticket is scanned by the mobile device, the mobile device may be configured to notify the sports wagering server to discard the unique PID number from the ticket and assign a new PID number stored in the mobile device. This way if the player drops the original paper ticket, it cannot be redeemed, but rather redemption relies upon presentation of the mobile device with the new PID number.

In one embodiment, when a sports wagering ticket is scanned, the sports wagering server is notified. If the ticket is scanned again the player can be notified on the physical mobile device application. This would provide a security mechanism for the player in case he scanned the ticket but then another person tried to scan the same ticket. In one embodiment, the player can delete or remove scanned sports wagering tickets from the mobile application and from memory of the mobile device.

As noted above, embodiments of the present disclosure contemplate a digital ticket management server and/or mobile device that is capable of organizing and analyzing multiple tickets for a player. With respect to organizing, in one embodiment, the player can organize the tickets by date, sports, event, status or other key parameters. This would allow a player to view all the NFL tickets together or all of the winners together on the mobile application. The application may also be configured to show a graph of all wagers from the previous month or only the wager for certain sports from the previous month. An appropriate organization of multiple tickets may enable easy reporting and/or bragging of wins or losses by the player. In some embodiments, the application operating on the mobile device may be configured to include hyperlinks in the reporting of wins/losses to a social networking account of the player. Selection of the hyperlink may enable the player to efficiently report their wager outcomes via their social networking profile and certain aspects of the reporting (e.g., wager type, wager amount, win amount, etc.) may be prepopulated into the social networking reporting message by the application.

With respect to analyzing, the application operating on the mobile device or a centralized digital ticket management server may have access to a collection of sports wagering tickets and the information from some or all of those tickets can be analyzed. The analysis could happen directly on the mobile application or on the digital ticket management server. The analysis could help the player become a better sports bettor by determining patterns that are successful or unsuccessful. For example, the analysis might note that the player tends to lose bets when betting on the underdog as a home team. Or the analysis might note that the player tends to win baseball American league teams when the point spread is over 2 runs. This aspect of analyzing may be attractive to the player because the player could be presented with graphs, charts, histograms, etc. that outline wager history, trends, and comparisons with other similar types of wagers or players. This may enable the player to identify and join betting groups or interact with similar players that enjoy betting on similar types of events.

It should further be appreciated that the results of the analysis (e.g., analytic results) may be printed or exported to an external computing device and/or database for storage. Alternatively or additionally, the results of the analysis may be printed or exported to an external computing device of a user to enable further decisions or actions to be taken by the user in connection with the analysis (e.g., to influence future wager decisions, update social media accounts, exchange messages with friends, etc.).

Although embodiments of the present disclosure will be described in connection with managing individual tickets with a single PID number associated therewith, it should be appreciated that the present disclosure is not so limited. For instance, Embodiments of the present disclosure contemplate that a sports wagering ticket can be provided with two bar codes. The first bar codes may correspond to a type of barcode that describes all of the information associated with the sports wagering ticket (e.g., wager amount, associated wager events, etc.), similar to ticket barcodes that exist today. The second barcode may correspond to a different and new barcode that the player uses to verify a ticket online. The existing ticket acceptor of a gaming device (e.g., a bill validator) may be configured ignore the second bar code because it would be in a different format and/or location from the first bar code. The new/second barcode wouldn't necessarily require a special application/instruction set to enable verification because the barcode would simply encode the verification data in the format that facilitates web-based verification (e.g., by pointing to a predetermined webpage).

Continuing the above example, when the player scans the ticket having two barcodes with their mobile device, a browser of the mobile device would automatically request web content from the website identified in the second barcode to provide a status of the ticket to the player. The player could perform this web-based ticket verification from their home or in casino. The identifier assigned to the ticket having multiple barcodes may include the PID number as described herein.

In some embodiments, it may be beneficial to further prevent somebody from "farming" the ticket numbers on the Internet. For example, the PID number on this new bar code could be a different number from the other PID number. The new PID number could be a large random number, such as a 1024-bit random number. When a wager is placed, the system would generate two PID numbers for the wager, one for using inside the casino and a second one for publicly verifying tickets. Or the number could be divided into two parts: (1) the PID number itself; and (2) an additional signature of the PID number.

With reference initially to FIG. 1, details of an illustrative gaming system 100 will be described in accordance with at least some embodiments of the present disclosure. The components of the gaming system 100, while depicted as having particular instruction sets and devices, is not necessarily limited to the examples depicted herein. Rather, a system according to embodiments of the present disclosure may include one, some, or all of the components depicted in the system 100 and does not necessarily have to include all of the components in a single device. For instance, the components of a server may be distributed amongst a plurality of servers and/or other devices (e.g., a gaming machine, a wager terminal, a mobile device, etc.) in the system 100 without departing from the scope of the present disclosure.

The gaming system 100 is shown to include a communication network 104 that interconnects and facilitates machine-to-machine communications between one or multiple gaming machines 108, a wager terminal 112, a digital ticket management server 116, and a game management server 148. It should be appreciated that the communication network 104 may correspond to one or many communication networks without departing from the scope of the present disclosure. In some embodiments, the various gaming machines 108 and server(s) 116, 148 may be configured to communicate using various nodes or components of the communication network 104. The communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

In some embodiments, gaming machines 108, wager terminals 112, and other devices described herein may be distributed throughout a single property or premises (e.g., a single casino floor) or gaming machines 108 and wager terminals 112 may be distributed among a plurality of different properties. Gaming machines 108, wager terminals 112, and mobile devices 160 may correspond to specific but non-limiting examples of a gaming device.

In a situation where the gaming machines 108 and wager terminals 112 are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming machines 108, as one example of a gaming device, may utilize the same or different types of communication protocols to connect with the communication network 104. It should also be appreciated that different gaming machines 108 may or may not present the same type of game to a player 164. Likewise, wager terminals 112, as another example of a gaming device, may or may not enable the player 164 to wager on the same types of events or redeem tickets based on outcomes of wagered events. It should also be appreciated that the servers 116, 148 may or may not be co-located with one or more gaming machines 108 or wager terminals 112 in the same property or premises. Thus, one or more gaming machines 108 may communicate with the game management server 148 over a WAN, such as the Internet. Likewise, one or more wager terminals 112 may communicated with the game management server 148 over a WAN. These same devices may communicate with the digital ticket management server 116 via a WAN or LAN, depending upon the configuration of the system 100. In the event that a WAN or similar type of untrusted communication network 104 is used between components, a tunneling protocol or Virtual Private Network (VPN) may be established over some of the communication network 104 to ensure that communications between nodes within a casino and a remotely-located node are secured.

The gaming machines 108 may correspond to a type of gaming device that enables player 164 interaction in connection with playing games of chance, games of skill, hybrid games of chance/skill, and/or place wagers on events (e.g., sporting competitions, races, etc.). The gaming machine 108 may also be configured as a terminal at which the player 164 can redeem winning tickets that were provided to the player 164 for a wager made on an outcome of an event. The wager terminal 112 may also correspond to a gaming device that enables 164 a player to place wagers on events and to redeem tickets. The wager terminal 112 may or may not enable the player 164 to interact with games of chance, games of skill, or hybrid games of chance/skill.

The player 164 may also be allowed to interact with games of chance, games of skill, hybrid games of chance/skill, and/or place wagers via their mobile device 160. In some embodiments, the mobile device 160, may operate as a remote control for a gaming machine 108 or wager terminal 112. In other embodiments, the mobile device 160 may operate similarly to a gaming machine 108 (e.g., by executing a local gaming application or by enabling a web-based interaction with a gaming application). A mobile device 160 may correspond to a player's 164 personal device or to a device issued to the player 164 during the player's visit at a particular casino. It should be appreciated that the player 164 may play games directly on their mobile device 164 and/or the mobile device 164 may be in communication with a gaming machine 108 or wager terminal 112 such that the mobile device 164 provides the interface for the player 164 to the gaming machine 108 or wager terminal 112. As shown in FIG. 1, the mobile device 164 may be in communication with the communication network 104 or in direct communication (e.g., via Bluetooth, WiFi, etc.) with a gaming machine 108 or wager terminal 112. In a situation where the mobile device 164 is in direct communication with the gaming machine 108 or wager terminal 112, a proximity-based communication protocol such as Bluetooth, WiFi, Near Field Communications (NFC), or the like, may be used to establish a proximity-based communication channel between the devices. Non-limiting examples of a mobile device 164 include a cellular phone, a smart phone, a tablet, a wearable device, an augmented reality headset, a virtual reality headset, a laptop, a Personal Computer (PC), or the like.

The digital ticket management server 116 is further shown to include a processor 120, memory 124, and a network interface 128. These resources may enable functionality of the digital ticket management server 116 as will be described herein. For instance, the network interface 128 provides the digital ticket management server 116 with the ability to send and receive communication packets or the like over the communication network 104. The network interface 128 may be provided as a network interface card (NIC), a network port, drivers for the same, and the like. Communications between the components of the digital ticket management server 116 and other devices connected to the communication network 104 may all flow through the network interface 128.

The processor 120 may correspond to one or many computer processing devices. For instance, the processor 120 may be provided as silicon, as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor 120 may be provided as a microprocessor, Central Processing Unit (CPU), or plurality of microprocessors that are configured to execute the instructions sets stored in memory 124. Upon executing the instruction sets stored in memory 124, the processor 120 enables various functions of the digital ticket management server 116.

The memory 124 may include any type of computer memory device or collection of computer memory devices. The memory 124 may be volatile or non-volatile in nature and, in some embodiments, may include a plurality of different memory devices. Non-limiting examples of memory 124 include Random Access Memory (RAM), Read Only Memory (ROM), flash memory, Electronically-Erasable Programmable ROM (EEPROM), Dynamic RAM (DRAM), etc. The memory 124 may be configured to store the instruction sets depicted in addition to temporarily storing data for the processor 120 to execute various types of routines or functions. In some embodiments, the memory 124 may include instructions that enable the processor 120 to store, manage, and interact with data stored in a digital ticket database 144. The instructions stored in memory 124 that provide this capability are shown as a database management instruction set 140. When executed by the processor 120, the database management instruction set 140 may be configured to write data to, read data from, and modify data stored in the digital ticket database 144. As will be discussed in further detail herein, the digital ticket database 144 may be used to store a list of PIDs, which may include a list of active PIDs 168 and/or a list of inactive PIDs 172. The list of PIDs and other data stored in the digital ticket database 144 may be managed by the digital ticket management instruction set 136, which operates in cooperation with the database management instruction set 140 to effect desired changes to the data stored in the digital ticket database 140.

Although depicted as a separate database, any of the information stored in the digital ticket database 144 may be stored in memory 124 of the digital ticket management server 116, in memory of the game management server 148, in memory of the mobile device 160, or in combinations thereof. In other words, the data structures described as being maintained in the digital ticket database 144 do not necessarily need to solely reside within the digital ticket database 144, but rather can be distributed among memory devices of other components in the system 100.

The other illustrative instruction sets that may be stored in memory 124 of the digital ticket management server 116 include, without limitation, a digital ticket ingestion instruction set 132 and the digital ticket management instruction set 132. Functions of the digital ticket management server 116 enabled by these various instruction sets will be described in further detail herein. It should be appreciated that the instruction sets depicted in FIG. 1 may be combined (partially or completely) with other instruction sets or may be further separated into additional and different instruction sets, depending upon configuration preferences for the digital ticket management server 116. Said another way, the particular instruction sets depicted in FIG. 1 should not be construed as limiting embodiments described herein.

In some embodiments, the digital ticket ingestion instruction set 132, when executed by the processor 120, may enable the digital ticket management server 116 to receive information about one or multiple digital tickets (or digital representations of physical tickets) from a gaming machine 108, from a wager terminal 112, and/or from a mobile device 160 of the player 164. The digital ticket ingestion instruction set 132 may be configured to format the information received about the digital ticket such that the digital ticket management instruction set 136 is able to process the data from the digital ticket. For instance, the digital ticket ingestion instruction set 132 may be configured to extract data payloads from messages transmitted by other devices that described digital tickets, extract data from images of physical tickets, and provide the appropriate data to the digital ticket management instruction set 136 for further processing.

The digital ticket management instruction set 136, when executed by the processor, may enable the digital ticket management server 116 to perform any task associated with storing, organizing, analyzing, or reporting events related to a digital ticket. In some embodiments, the digital ticket management instruction set 136 may also enable cooperative interactions with the game management server 148. For instance, as event outcomes occur and the game management server 148 provides a notification of the event outcome, the digital ticket management instruction set 136 may be configured to determine if the event outcomes correlate to a digital ticket maintained in the digital ticket database 144. If such a correlation is determined, then the digital ticket management instruction set 136 may take appropriate steps to update the database 144 and to notify the player 164 that stored the ticket in the database 144 of the outcome of their wager and the availability to redeem the ticket (e.g., via the gaming machine 108, wager terminal 112, and/or mobile device 160).

The game management server 148 is depicted as being separate from the digital ticket management server 116, but it should be appreciated that a single server can be configured with the capabilities of both servers 116, 148. The game management server 148 is also shown to include a processor 120, memory 124, and network interface 128. The game management server 148 may be configured to specifically manage activities, messages, and notifications related to games played at gaming machines 108, wagers placed or redeemed at the gaming machine 108, wagers placed or redeemed at the wager terminal 112, wagers placed or redeemed at the mobile device 160, and the like. As an example, the game management server 148 may be configured to interact with gaming machines 108, wager terminals 112, and/or mobile devices 160 to allow the player 164 to place wagers on events, cause physical tickets to be printed for such wagers, cause digital tickets to be assigned for such wagers, determine when events have concluded, and determine whether any wagers placed on an event should be paid or not based on the outcome of the event.

The memory 124 of the game management server 148 may be provided with instruction sets that enable these and other functions related to game management, wager management, and the like. The illustrative types of instruction sets that may be stored in the game management server 148 include, without limitation, a game/event management instruction set 152 and a payout reconciliation instruction set 156.

The game/event management instruction set 152, when executed by the processor 120, may enable the game management server 148 to manage the various games played by a player 164 at the gaming machines 108. Alternatively or additionally, the game/event management instruction set 152 may track wagers placed by the player 164 at a gaming machine 108, wager terminal 112, and/or mobile device 160 and may help store information related to such wagers in a wager management database 176. In some embodiments, the game/event management instruction set 152 may also be configured to track a status of wager events (e.g., sporting events, race events, bingo, keno, lottery, etc.) and whether a player 164 has placed a wager on such events. In some embodiments, when a wager event has come to completion such that wagers made on the event become payable (e.g., at the end of a sporting event when the final score of the event is determined), the game/event management instruction set 152 may notify the payout reconciliation instruction set 156, thereby enabling the payout reconciliation instruction set 156 to update the wager management database 176 and send event notification messages to the gaming machine 108, wager terminal 112, digital ticket management server 116, and/or mobile device 160 to notify such devices of the event outcome and the related outcome of the wager(s) placed on the event.

With reference now to FIG. 2, additional details of data structures that are useable in connection with managing digital tickets, electronic records of digital tickets, wager events, and outcomes of wagers placed on events will be described in accordance with at least some embodiments of the present disclosure. It should be appreciated that the data structures depicted and described herein may be stored within a central database or may be distributed among a number of data storage nodes. Alternatively or additionally, some or all of the fields of the data structures may be maintained in devices of the gaming system 100 such as the gaming machine 108, the wager terminal 112, the digital ticket management server 116, and/or the mobile device 160 without departing from the scope of the present disclosure.

Figure 2A:
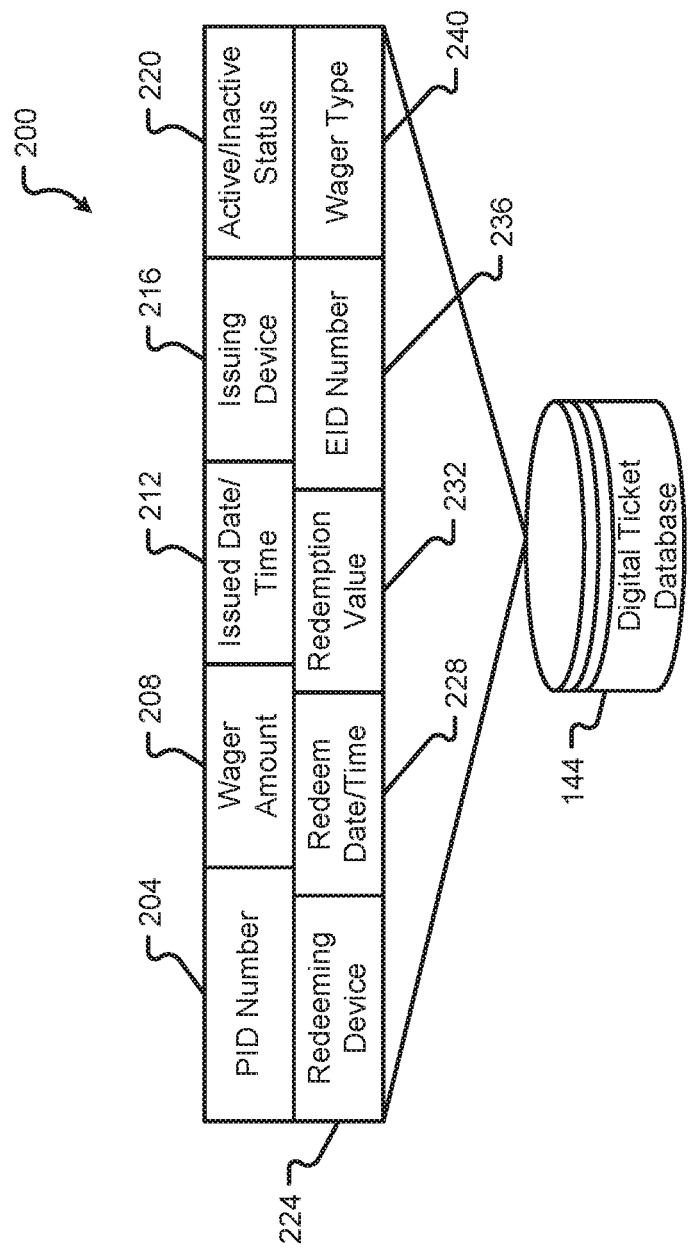
FIG. 2A is a block diagram depicting an illustrative data structure used in accordance with embodiments of the present disclosure.

FIG. 2A-2C illustrate details of a data structure 200 that may be used in connection with maintaining electronic records of digital tickets and the like. In some embodiments, the data stored in the data structure 200 may be stored for a plurality of different tickets, whether digital tickets, physical tickets, or a combination thereof, and may or may not be organized based on events, player association, etc. Furthermore, the data structure 200 or the fields depicted therein may be stored in the digital ticket database 144, the wager management database 176, and/or memory of any device depicted in the system 100. It should further be appreciated that a ticket can have more than one event associated therewith. For example, a parlay ticket may have a plurality of events (e.g., 12 or more events) associated with a single wager. Furthermore, a single ticket could have multiple wagers on different events. As will be discussed in connection with FIGS. 2B and 2C, this information could be stored with one PID or each wager could be stored separated even though they all have the same PID (ticket). It may also be possible for a single ticket to have multiple PID numbers without departing from the scope of the present disclosure.

With reference to FIG. 2A, embodiments of the data structure 200 may contain a plurality of data fields that include, for instance, a PID number field 204, a wager amount field 208, an issued date/time field 212, an issuing device field 216, an active/inactive status field 220, a redeeming device field 224, a redeem date/time field 228, a redemption value field 232, an Event Identification (EID) number field 236, and a wager type field 240. It should be appreciated that the data structure 200 may have greater or fewer fields than depicted in FIG. 2A.

The PID number field 204 may be used to store a unique number or alphanumeric string assigned to a physical ticket, digital ticket, or the like, when a ticket is issued to a player 164. In some embodiments, the data stored in the PID number field 204 may be randomly generated, pseudo-randomly generated, or sequentially generated based on when the ticket is issued. In some embodiments, the PID number assigned to the ticket may be globally unique to the ticket within the gaming system 100 (e.g., at least unique as to any other ticket issued within the gaming system 100). While numeric values may be used for the PID number, it should be appreciated that any alphanumeric string may be used for the PID number stored in the PID number field 204.

The wager amount field 208 may be used to store an electronic record of a monetary value for which the particular ticket was issued. The wager amount field 208 may correspond to a data field that is written once and not updated. Thus, even when an associated ticket transitions from the issued state to another state, the value recorded in the wager amount field 208 may be left unchanged. Likewise, the information stored in the issued date/time field 212 and issuing device field 216 may also be written once and not changed thereafter. The issued date/time field 212 may store information describing when a ticket is issued whereas the issuing device field 216 may store information describing where a ticket is issued. For instance, the issuing device field 216 may indicate a unique serial number assigned to a gaming machine 108, wagering terminal 112, or mobile device 160 that was used to issue the ticket to the player 164 and the issued date/time field 212 may store the time at which the ticket was issued by the device. In some embodiments, the issued date/time field 212 may be populated based on a clock of the device that issued the ticket rather than relying on the clock of the digital ticket management server 116 or the game management server 148. Said another way, when a device issues a ticket (e.g., electronically or by printing a physical ticket), such information may be communicated back to the digital ticket management server 116 along with a timestamp provided by the issuing device to indicate a time at which the device issued the ticket. Using the time indicated by the issuing device can help account for or avoid problems associated with delays in communication over the communication network 104. One such possible problem would be having a wagered event (e.g., a sporting event) come to completion while the communication network 104 is down or unavailable and before the digital ticket management server 116 becomes aware of an issued ticket by a issuing device. Of course, it may also be possible or desirable to use the clock of the digital ticket management server 116 as the centralized authority on all date/times entered into the field 212, thereby avoiding the need to synchronize or consideration synchronization issues between various issuing devices.

The active/inactive status field 220 may correspond to a particular data field indicating whether a particular ticket is still active (e.g., subject to an event coming to completion, available for redemption, or otherwise still unredeemed. In some embodiments, the active/inactive status field 220 may include a bit that is flipped to indicate whether an associated ticket is active or inactive. In some embodiments, the value of the bit in the active/inactive status field 220 may determine whether a particular ticket (and the ticket's PID number) is stored as part of a list of active PIDs 168 or a list of inactive PIDs 172.

Like the issuing device field 216, the redeeming device field 224 may be used to store information describing a device at which a ticket is redeemed by a player 164. In some embodiments, a redeeming device may correspond to a gaming machine 108, wager terminal 112, or a mobile device 160. A player 164 may be allowed to redeem a ticket at a gaming machine 108 or a wager terminal 112 by inserting a printed ticket into a ticket acceptance device of the gaming machine 108 or wager terminal 112 (e.g., similar to a bill acceptor). Alternatively or additionally, a player 164 may present their mobile device 160 with an image of a ticket thereon to a gaming machine 108 or wager terminal 112 to redeem the ticket, rather than providing a physical ticket to the gaming machine 108 or wager terminal 112. Alternatively or additionally, a player 164 may be allowed to redeem a ticket at a mobile device 160 by selecting a digital version of the ticket stored on the mobile device 160 and indicating that the ticket should be redeemed. This particular redemption model may require the mobile device 160 to interact with the game management server 148 and/or digital ticket management server 116 to ensure that the digital ticket being redeemed at the mobile device 160 is eligible for redemption. Thus, the redeeming device field 224 may store information uniquely describing the device used by the player 164 to redeem a ticket (e.g., an address or device ID). Alternatively or additionally, the redeeming device field 224 may store information describing a type of device that was used for redemption (e.g., whether the device is a gaming machine 108, wager terminal 112, or a mobile device 160)

The redemption date/time field 228, similar to the issued date/time field 212, may be used to store data and/or time information for the ticket. However, the redemption date/time field 228 may be used to store a date/time when a ticket is redeemed as opposed to when the ticket is issued. Again, the time indicated in the field 228 may be based on a timestamp issued by the redeeming device and/or a clock of the digital ticket management server 116. The date/time provided in the data field 228 may correlate to a date/time when the state of the ticket transitions within the active/inactive status field 220. Thus, when the electronic record of the data field 220 is updated, a change to the redeem date/time in field 228 may also be made at substantially the same time.

The redemption value field 232 may be used to store an electronic record indicating an amount for which a ticket may be redeemed (e.g., a redeemable value) and/or an amount for which a ticket is actually redeemed (e.g., a redeemed/redemption amount). In embodiments where the redeemable value is the same as the redeemed/redemption value, there may only need to be a single data field 232 to store the redemption value for the ticket.

The EID number field 236 may be used to store an EID number associated with the ticket. In some embodiments, the EID number field 236 may include a number or alpha-numeric string that is uniquely assigned to an event that is the subject of the wager for the ticket. The EID number field 236 may indicate a name of an event that can be wagered, a time of the event, entities involved in the event, or any other information that describes the event in a substantially unique way. Alternatively, a unique number may be assigned to each event and stored in the EID number field 236.

The wager type field 240 may be used to store information related to a type of wager associated with the ticket. In some embodiments, a wager type may correspond to a type of bet made with the ticket (e.g., conditional bet, parlay bet, normal bet, field bet, etc.). The wager type may provide an indication of the nature of the wager rather than simply identifying the event and the wager amount. In some embodiments, a normal wager may be indicated with no entry or a default entry in the wager type field.

FIGS. 2B and 2C depict two different formats of a data structure 200 that may be used without departing from the scope of the present disclosure. FIG. 2B, for instance, depicts a plurality of different wagers 244 being associated with a single PID number field 204. In this scenario, the PID number contained in the PID number field 204 may identified a specific and unique ticket and that ticket may have included a plurality of different wagers 244. Each wager 244 included in the ticket and associated with the PID number field 204 may have a unique wager identifier and each wager 244 may have a unique set of fields (e.g., issued date/time field 212, wager amount field 208, EID number field 236, and wager type field 240).

Another possible format of the data structure 200 is shown in FIG. 2C where a single wager 244 is associated with the PID number field 204, but there are multiple EID number fields 236 associated with the single wager 244. This format of data structure 200 may be used in connection with parlay bets and other bets where multiple events (and therefore multiple EID numbers) are associated with a single wager 244. The outcome of the wager 244 may depend upon the outcome of one, some, or all of the events identified in the various EID number fields 326.

Figure 3:
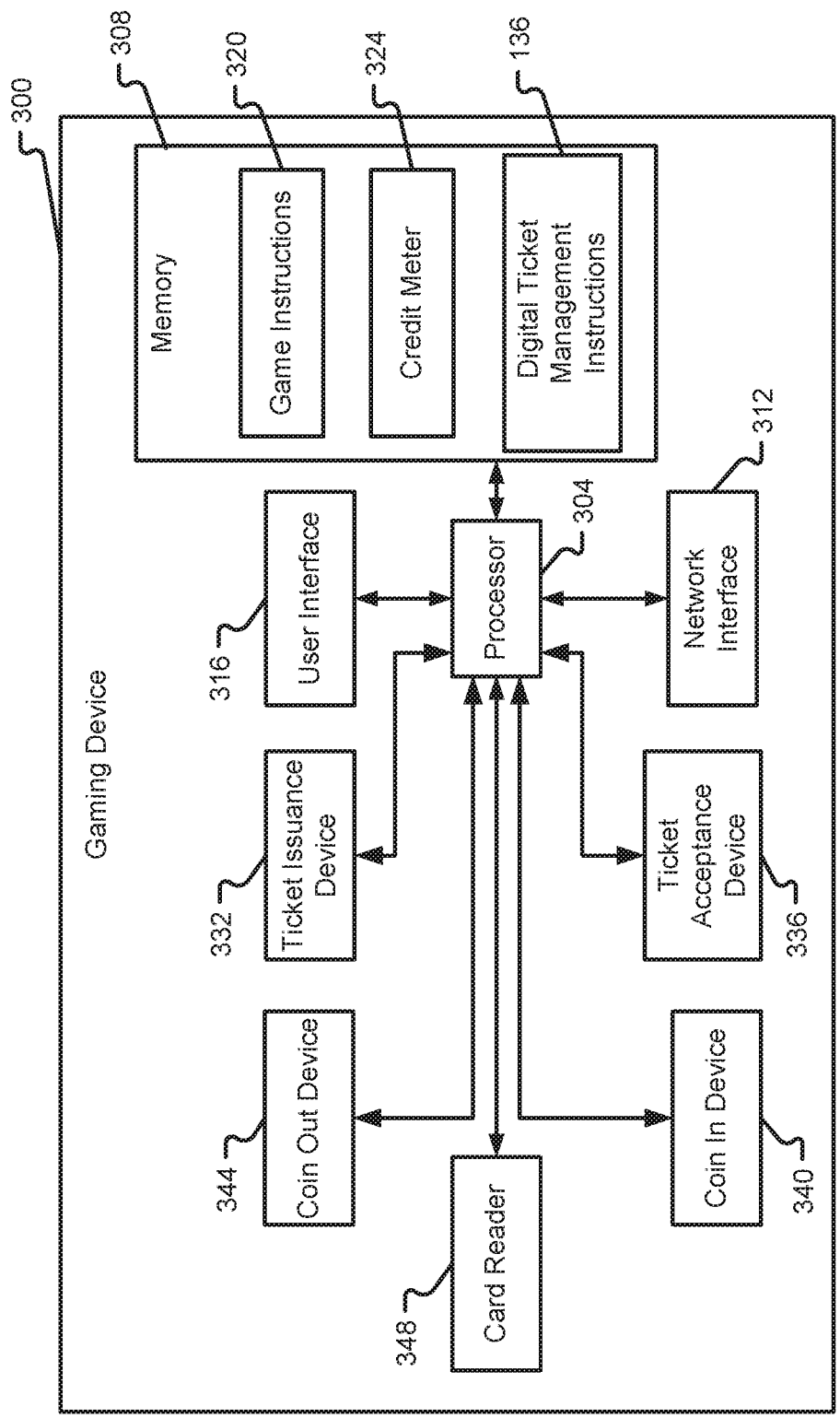
FIG. 3 is a block diagram depicting an illustrative gaming machine in accordance with embodiments of the present disclosure.

With reference now to FIG. 3, additional details of a gaming device 300 will be described in accordance with at least some embodiments of the present disclosure. It should be appreciated that a gaming device 300 may correspond to a gaming machine 108, a wager terminal 112, a mobile device 160, a combination thereof, or any other device that facilitates user interaction with a game or enables wager activity as described herein.

The gaming device 300 is depicted to include a processor 304, memory 308, a network interface 312, a user interface 316, a ticket issuance device 332, a ticket acceptance device 336, a coin in device 340, a coin out device 344, and a card reader 348. In some embodiments, the processor 304 may be similar or identical to the processor 120. In other words, the processor 304 may correspond to one or many microprocessors, CPUs, microcontrollers, or the like. The processor 304 may be configured to execute one or more instruction sets stored in memory 308.

The network interface 312 may also be similar or identical to network interface 128. The nature of the network interface 312, however, may depend upon whether the network interface 312 is provided in a gaming machine 108 or a mobile user device 160. Examples of a suitable network interface 312 include, without limitation, an Ethernet port, a USB port, an RS-232 port, an RS-485 port, a NIC, an antenna, a Slot Machine Interface Board (SMIB), a driver circuit, a modulator/demodulator, etc. The network interface 312 may include one or multiple different network interfaces depending upon whether the gaming device 300 is connecting to a single communication network 104 or multiple different types of communication networks 104. For instance, the gaming device 300 may be provided with both a wired network interface and a wireless network interface without departing from the scope of the present disclosure.

The user interface 316 may correspond to any type of input and/or output device that enables the player 164 to interact with the gaming device 300. As can be appreciated, the nature of the user interface 316 may depend upon the nature of the gaming machine 108. For instance, if the gaming device 300 is a traditional mechanical reel slot machine, then the user interface 316 may include one or more mechanical reels with symbols provided thereon, one or more lights or LED displays, one or more depressible buttons, a lever or "one armed bandit handle", a speaker, or combinations thereof. If the gaming device 300 is a digital device, then the user interface 316 may include one or more touch-sensitive displays, LED/LCD display screens, etc.

The memory 308 may be similar or identical to memory 124. For instance, the memory 308 may include one or multiple computer memory devices that are volatile or non-volatile. The memory 308 may be configured to store instruction sets that enable player interaction with the gaming device 300, that enable game play at the gaming device 300, that enable wagering at the gaming device 300, and/or that enable coordination with the digital ticket management server 116 and/or game management server 148. Examples of instruction sets that may be stored in the memory 308 include a game instruction set 320, a credit meter 324, and a digital ticket management instruction set 136. The digital ticket management instruction set 136 may be similar or identical to the digital ticket management instruction set 136 stored and executed in the digital ticket management server 116. Alternatively, the digital ticket management instruction set 136 maintained and executed by the gaming device 300 may implement client-side game or wager management functions whereas the digital ticket management instruction set 136 maintained and executed by the digital ticket management server 116 may implement server-side game or wager management functions.

In some embodiments, the game instructions 320, when executed by the processor 304, may enable the gaming device 300 to facilitate one or more games of chance, one or more games of skill, and/or one or more hybrid games of chance/skill and produce interactions between the player 164 and the game of chance and/or skill. In some embodiments, the game instructions 320 may include subroutines that present one or more graphics to the player 164 via the user interface 316, subroutines that calculate whether a particular wager has resulted in a win or loss during the game of chance or skill, subroutines for determining payouts for the player 164 in the event of a win, subroutines for exchanging communications with a connected server (e.g., game management server, digital ticket management server 116, or the like), subroutines for enabling the player 164 to engage in a game using their mobile user device 160, and any other subroutine or set of instructions that facilitate gameplay at or in association with the gaming device 300. Alternatively or additionally, depending upon the nature of the gaming device 300 (or if implemented in a wager terminal 112), the game instruction set 320 may enable a player 164 to place wagers on events, track event progress, track event outcomes, organize tickets associated with wagered events, report outcomes of wagered events, report win amounts for tickets associated with game outcomes, and the like. In some embodiments, the game instruction set 320 may also provide the player 164 with the ability to view, in real-time, events that have been the subject of a wager.

The credit meter 324 may correspond to a secure instruction set and/or data structure within the gaming device 300 that facilitates a tracking of wager activity at the gaming device 300. In some embodiments, the credit meter 324 may be used to store or log information related to various player 164 activities and events that occur at the gaming device 300. The types of information that may be maintained in the credit meter 324 include, without limitation, player information, available credit information, wager amount information, and other types of information that may or may not need to be recorded for purposes of accounting for wagers placed at the gaming device 300 and payouts made for a player 164. In some embodiments, the credit meter 324 may be configured to track coin in activity, coin out activity, coin drop activity, jackpot paid activity, bonus paid activity, credits applied activity, external bonus payout activity, ticket in activity, ticket out activity, timing of events that occur at the gaming device 300, and the like. In some embodiments, certain portions of the credit meter 324 may be updated in response to outcomes of a game of chance or skill played at the gaming device 300. In some embodiments, the credit meter 324 may be updated depending upon whether the gaming device 300 is issuing a ticket, being used as a point of redemption for a ticket, and/or any other activity associated with a ticket. Some or all of the data within the credit meter 324 may be reported to the digital ticket management server 116 or game management server 148, for example, if such data applies to a centrally-managed game and/or a status of a ticket. As an example, the number, value, and timing of wagers placed by a particular player 164 and payouts on such wagers may be reported to the digital ticket management server 116.

Activities of the gaming device 300 related to ticket activity may be managed and reported by the digital ticket management instruction set 328. In some embodiments, when a ticket is redeemed at the gaming device 300 by the player 164, information associated with the ticket may be obtained by the ticket management instruction set 328 and reported to the digital ticket management server 116. Furthermore, the ticket management instruction set 328 may be configured to update the credit meter 324 if the redeemed ticket is determined to be in a redeemable state and has a redeemable or redemption value associated therewith. In some embodiments, the credit meter 324 may be updated or incremented by the redeemable or redemption value of the ticket when redeemed. This information may be obtained directly from the ticket or may require some interactions with the digital ticket management server 116 prior to updating the credit meter 324.

Because the gaming device 300 may be used for the acceptance and issuance of tickets/vouchers, the gaming device 300 may be provided with appropriate hardware to facilitate such acceptance and issuance. Specifically, the gaming device 300 may be provided with a ticket acceptance device 336 that is configured to accept or scan physically-printed tickets/vouchers and extract appropriate information therefrom. In some embodiments, the ticket acceptance device 336 may include one or more machine vision devices (e.g., a camera, IR scanner, optical scanner, barcode scanner, etc.), a physical ticket acceptor, a shredder, etc. The ticket acceptance device 336 may be configured to accept physical tickets and/or electronic tickets without departing from the scope of the present disclosure. An electronic ticket may be accepted by scanning a one-dimensional barcode, two-dimensional barcode, or other type of barcode or quick response (QR) code displayed by a player's 164 mobile device 160, for example. In addition to enabling machine acceptance of tickets, the ticket acceptance device 336 may also be configured to accept other physical pieces of paper (e.g., paper currency, bills, receipts, etc.).

The ticket issuance device 332 may be configured to print or provide physical tickets/vouchers to players 112. In some embodiments, the ticket issuance device 332 may be configured to issue a ticket consistent with an amount of credit available to a player 164, possibly as indicated within the credit meter 324. In addition to enabling machine interaction or provisioning of tickets, the ticket issuance device 332 may also be configured to deliver physical pieces of paper (e.g., paper currency, bills, receipts, etc.) to a player 112.

The coin in device 340 may include a coin acceptor, a chip acceptor or reader, a token acceptor, or the like. The coin out device 344, like the ticket issuance device 322, may operate and issue real currency or playing currency in the form of coins, tokens, or chips based on an amount indicated within the credit meter 324. In some embodiments, the coin out device 344 may include a coin tray or the like and counting hardware configured to count and distribute an appropriate amount of coins or tokens based on a player's 164 winnings or available credit within the credit meter 324.

Although not depicted, the gaming device 300 may also include an instruction set that enables and manages communications and interactions with a mobile device 160. In some embodiments, a set of communication instructions may be provided in memory 308 to enable the gaming machine 108 to pair with a mobile device 160 and exchange information with the mobile device 160 using a proximity-based communication channel.

The card reader 348 may include hardware and/or software configured to read or accept any type of card or portable credential. In some embodiments, the card reader 348 may include hardware and/or software that enable contactless reading of a card or portable credential (e.g., NFC, Bluetooth, Wifi, etc.). In some embodiments, the card reader 348 may include hardware and/or software that enables contact-based reading of a card or portable credential (e.g., magstripe, chip reader, electrodes, card-receiving slot, etc.). It should be appreciated that the card reader 348 may be configured to receive and read a card or portable credential in any type of format (e.g., portable plastic card, magstripe card, key fob, etc.). It should also be appreciated that the card reader 348 may be configured to write information or data onto a card or portable credential. Furthermore, in some embodiments, the card reader 348 may be configured to read a player loyalty card in the form of a plastic credit-card shaped credential. In some embodiments, the card reader 348 may be enable communications with a loyalty application operating on a user's mobile device 160.

Figure 4:
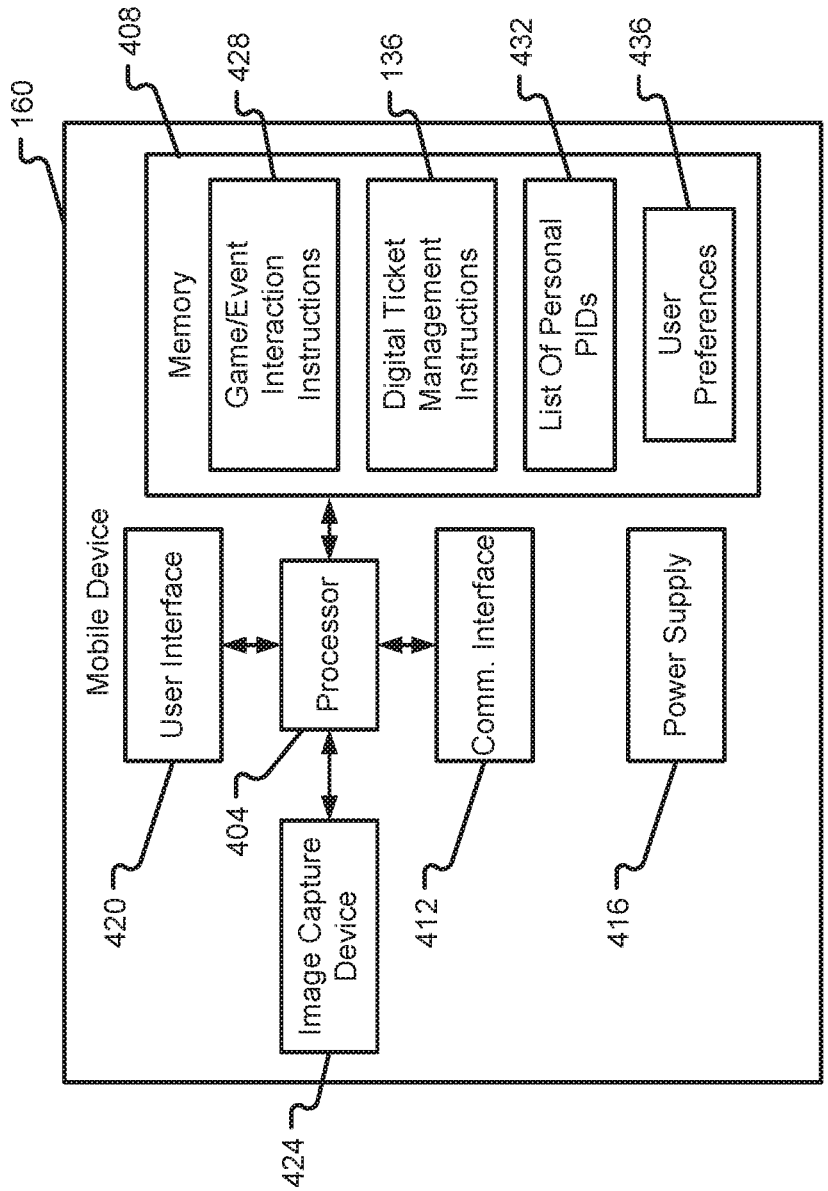
FIG. 4 is a block diagram depicting a mobile device in accordance with embodiments of the present disclosure.

With reference now to FIG. 4, additional details of the components that may be included in a mobile device 160 will be described in accordance with at least some embodiments of the present disclosure. The mobile device 160, being one specific but non-limiting example of a gaming device 300, is shown to include a processor 404, memory 408, a communication interface 412, a user interface 420, and an image capture device 424. In some embodiments, the processor 404 may be similar or identical to any of the other processors 120, 308 depicted and described herein and may correspond to one or many microprocessors, CPUs, microcontrollers, Integrated Circuit (IC) chips, or the like. The processor 404 may be configured to execute one or more instruction sets stored in memory 408. In some embodiments, the instruction sets stored in memory 408, when executed by the processor 404, may enable the mobile device 160 to provide game play functionality, interact with gaming machines 108, pair with gaming machines 108, interact with wager terminals 112, pair with wager terminals 112, manage digital tickets, track wager activity associated with digital tickets, or any other type of desired functionality.

The communication interface 412 may be similar or identical to the network interfaces 128, 312 depicted and described herein. The nature of the communication interface 412 may depend upon the type of communication network 108 for which the mobile device 160 is configured. Examples of a suitable communication interfaces 412 include, without limitation, a WiFi antenna and driver circuit, a Bluetooth antenna and driver circuit, a cellular communication antenna and driver circuit, a modulator/demodulator, etc. The communication interface 412 may include one or multiple different network interfaces depending upon whether the mobile device 160 is connecting to a single communication network 104 or multiple different types of communication networks. For instance, the mobile device 160 may be provided with both a wired communication interface 412 and a wireless communication interface 412 without departing from the scope of the present disclosure.

The user interface 420 may include a combination of a user input and user output device. For instance, the user interface 420 may include a display device, a microphone, a speaker, a haptic feedback device, a light, a touch-sensitive display, a button, or a combination thereof. The user interface 420 may also include one or more drivers for the various hardware components that enable user interaction with the mobile device 160.

The memory 408 may be similar or identical to other memory 124, 308 depicted and described herein and may include one or multiple computer memory devices that are volatile or non-volatile. The memory 408 may be configured to store instruction sets that enable player interaction with the mobile device 160 and that enable game play at the mobile device 160. An illustrative instruction set that may be included in memory 408 is a game/event interaction instruction set 428. In some embodiments, the game/event interaction instruction set 428 may enable the mobile device 160 to communicate with a game executed by a gaming machine 108 and may also include instructions that allow the mobile device 160 to interact with a wager terminal 112 for purposes of placing a wager on an event and having a ticket assigned to such a wager. Furthermore, as discussed above, the mobile device 160 may be configured to receive information from the game management server 148 that describes tickets stored for a player 164.

The game/event interaction instruction set 428 may coordinate with the digital ticket management instruction set 136 to store, organize, and/or analyze tickets for the player 164 that wagered on various events. In other words, the game/event interaction instruction set 428 may be configured to determine information related to events and wagers placed relative to events whereas the digital ticket management instruction set 136 may be leveraged to manage the digital tickets associated with wagers managed by the game/event interaction instruction set 428. In some embodiments, the game/event interaction instruction set 428 may manage interactions with the game management server 148 whereas the digital ticket management instruction set 136 may manage interactions with the digital ticket management server 116.

The digital ticket management instruction set 136 may be similar to or a client-side portion of the digital ticket management instruction sets 136 depicted and described herein. In some embodiments, the digital ticket management instruction set 136 of the mobile device 160 may be used to manage, organize, and analyze tickets that are owned by or assigned to the player 164 that owns the mobile device 160. The digital ticket management instruction set 136 may also be configured to manage electronic records of the tickets in local memory 408 and maintain a list of personal PIDs 432 that are associated with tickets owned by or assigned to the player 164 that owns the mobile device 160. In some embodiments, the list of personal PIDs 432 may be maintained and synchronized with data in the digital ticket database 144. In some embodiments, the list of personal PIDs 432 may only include those PIDs numbers for tickets that were purchased by the player 164 at the mobile device 160 or that were ingested by the mobile device 160. For instance, the player 164 may be allowed to place a wager at a wager terminal 112 and have a physical ticket printed thereby. The physical ticket may be scanned with an image capture device 424 of the mobile device 160 and the data from the image of the physical ticket may be processed by the digital ticket management instruction set 136 of the mobile device 160. The PID number for any ticket scanned by the mobile device 160 or communicated to the mobile device 160 by another gaming device (e.g., a gaming machine 108 or wager terminal 112) may be maintained in the list of personal PIDs 432 and then communicated to the digital ticket management server 116 for further processing.

The image capture device 124 may correspond to one or multiple devices and drivers for capturing an image of a physical object (e.g., a physical printed ticket) and then transforming the image of the physical object into a digital representation of the object (e.g., a digital ticket). The image capture device 124 may include a camera, lens, shutter, set of image pickup elements, or any other hardware or software component used to collect light and transform the collected light into digital image data (e.g., pixel data).

Although not shown, the memory 408 may also include a communication instruction set that, when executed by the processor 404, enables the mobile device 160 to communicate via the communication network 104. In some embodiments, the communication instruction set may be particular to the type of communication network 104 used by the mobile device 160. As an example, the communication instruction set on the mobile device 160 may be configured to enable cellular, WiFi, and/or Bluetooth communications with other devices. The communication instruction set may follow predefined communication protocols and, in some embodiments, may enable the mobile device to remain paired with a gaming machine 108 or wager terminal 112 as long as the mobile device 160 is within a predetermined proximity (e.g., 20-30 feet, an NFC communication range, or a Bluetooth communication range).

The user preferences 436 may correspond to gaming, device, and/or wager preferences that are desired by the user 164 of the mobile device 160. In some embodiments, where the mobile device 160 is not owned by the user 164, but rather is loaned to the user 164 by a casino operator, a friend of the user 164, a spouse of the user 164, etc., the user preferences 436 may include default preferences defined by the loaning person/entity as well as other preferences that are defined by the user 164 after receiving the mobile device 160. The user preferences 436 may alternatively or additionally relate to communication preferences that drive operation of the communication instruction set. In some embodiments, the user preferences 436 may include wager strategies, reporting preferences, digital ticket management preferences, and the like that enable ticket management as described herein. The user preferences 436 may also include uploaded or downloaded wager history. In some embodiments, the user preferences 436 may be stored locally only whereas in other embodiments the user preferences 436 may be stored remotely. A user 164 may be provided with the option to store the user preferences 436 locally and/or remotely based on the user's 164 privacy concerns. Alternatively or additionally, encrypted credentials may be used as part of the user preferences 436. Such encrypted credentials may be part of a user's loyalty account and may be encrypted with a private key that is uniquely assigned to the user 164.

The mobile device 160 is also shown to include a power supply 416. The power supply 416 may correspond to an internal power supply that provides AC and/or DC power to components of the mobile device 160. In some embodiments, the power supply 416 may correspond to one or multiple batteries. Alternatively or additionally, the power supply 416 may include a power adapter that converts AC power into DC power for direct application to components of the mobile device 160, for charging a battery, for charging a capacitor, or a combination thereof.

With reference now to FIGS. 5-11, various methods of operating components of a system 100 will be described herein. It should be appreciated that any of the methods or the method steps depicted and described herein can be performed by any device depicted and described herein and may be performed in an order other than the order depicted. Moreover, steps from one method may be performed in another method without departing from the scope of the present disclosure.

Figure 5:
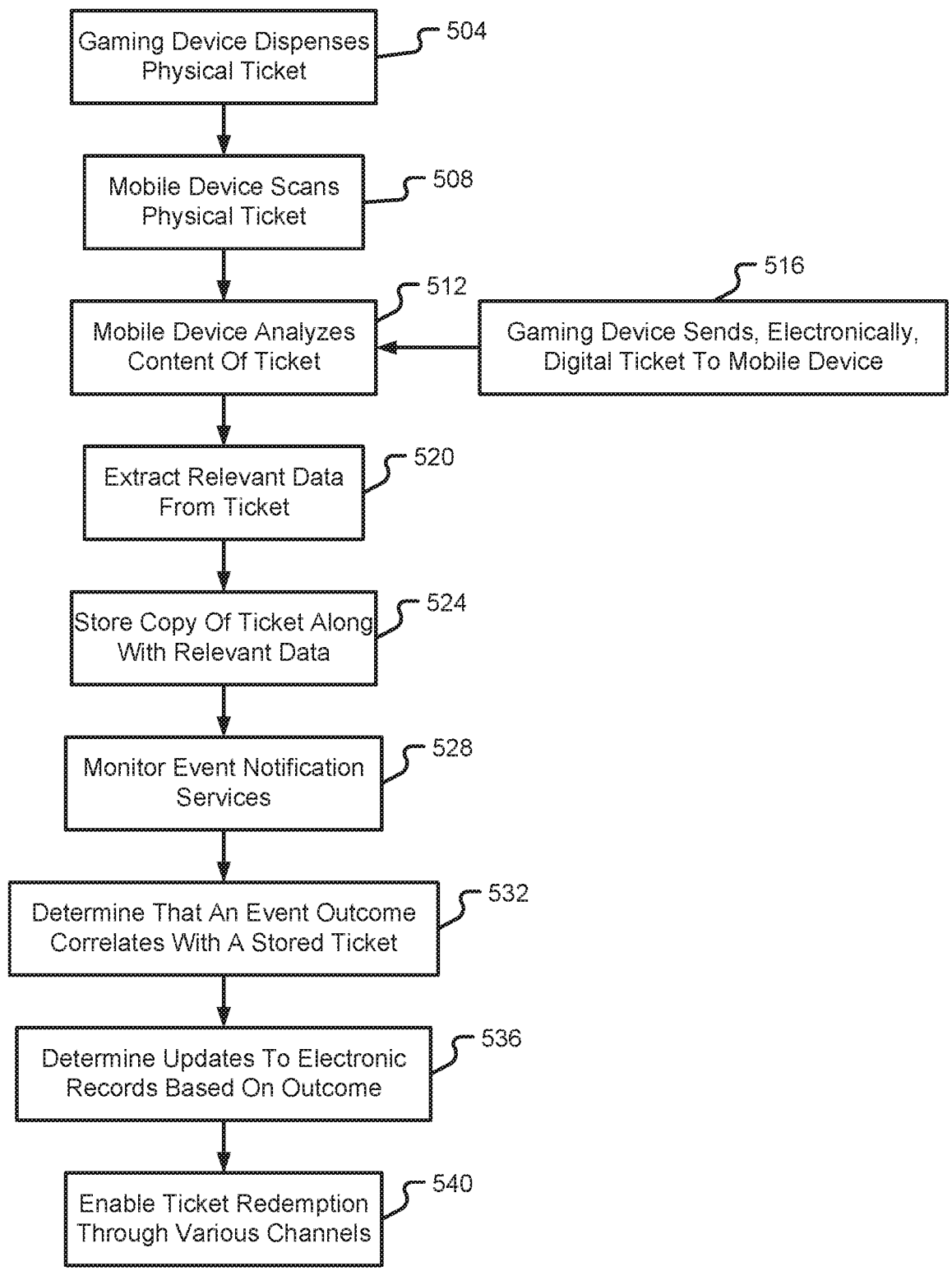
FIG. 5 is a flow diagram depicting a first method in accordance with embodiments of the present disclosure.

With reference initially to FIG. 5, a first method will be described in accordance with at least some embodiments of the present disclosure. The method begins when a gaming device 300 dispenses a physical ticket via the ticket issuance device 332 (step 504). The physical ticket may be received by the player 164 and then placed in front of an image capture device 424 of the player's 164 mobile device 160 (step 508). After an image of the physical ticket is received in the mobile device 160, the method continues with the mobile device 160 invoking the digital ticket management instruction set 136 provided thereon to analyze content of the image (step 512) and determine relevant data from the image that can be used to create a digital representation of the physical ticket issued by the gaming device 300.

In other embodiments, the gaming device 300 may not necessarily print a physical ticket, but rather an electronic ticket may be issued by the gaming device 300 and the electronic ticket may be transmitted to the mobile device 160 (step 516). The transmission of the electronic ticket to the mobile device 160 may be achieved by using a proximity-based communication channel established between the mobile device 160 and gaming device 300. As an example, the gaming device 300 may issue an electronic ticket in response to a wager placed by the player 164 at the gaming device 300 and transmit information about the electronic ticket to the player's 164 mobile device 160 via a Bluetooth pairing established between the devices. The data payload may then be extracted from the electronic ticket as one or more data packets or extracted from the physical ticket based on an image analysis of the ticket (step 520).

The process performed in step 512, 516, and 520 may be similar regardless of whether or not the ticket information comes from an image of a physical ticket or via an electronic ticket. Additionally, the data extracted from the ticket in step 520 should be the same regardless of whether the ticket was originally a physical ticket or an electronic ticket. The relevant data that may be extracted from the ticket (whether physical or electronic) may include the PID number representing a substantially unique identifier assigned to the ticket, a timestamp or date/time information associated with a time that the ticket was produced, an EID number representing an event on which a wager was placed, a wager type, and a wager amount associated with the wager.

The method may continue with the digital ticket management instruction set 136 storing a copy of the ticket (e.g., the electronic ticket or a copy of the image of the physical ticket) in memory 408 along with the relevant data extracted from the ticket (step 524). Thereafter, the game/event interaction instruction set 428 may monitor or exchange communications with the game management server 148 to determine if a wagered event has come to a conclusion or the event has produced an outcome that impacts a wager made for the event (step 528). If the game/event interaction instruction set 428 determines that an event outcome is correlated with a ticket stored in memory 408 (e.g., represented by a PID in the list of personal PIDs 432) (step 532), the method may then continue with the mobile device 160 causing appropriate electronic records associated with affected ticket to be updated based on the event outcome (step 536). Such electronic records may be updated in memory 408 or in the digital ticket database 144.

If the outcome of the event results in a ticket become redeemable for an amount, then the ticket may be configured to be redeemed by the player 164 via interactions at the mobile device 160, interactions at a gaming machine 108, and/or interactions at a wager terminal 112 (step 540). In some embodiments, the ability to redeem a ticket may first be recognized by the game management server 148 and information regarding the ticket and its redemption value may be communicated to other devices in the system 100, such as the gaming machine 108, wager terminal 112, mobile device 160, gaming device 300, and/or digital ticket management server 116. Once these additional devices become aware of the redemption value for a ticket, then the player 164 may be notified of the ability to redeem the ticket and may be provided with instructions for such redemption (e.g., "present your ticket for redemption by displaying the stored image of your ticket on your mobile device 160 to a gaming device 300").

Figure 6:
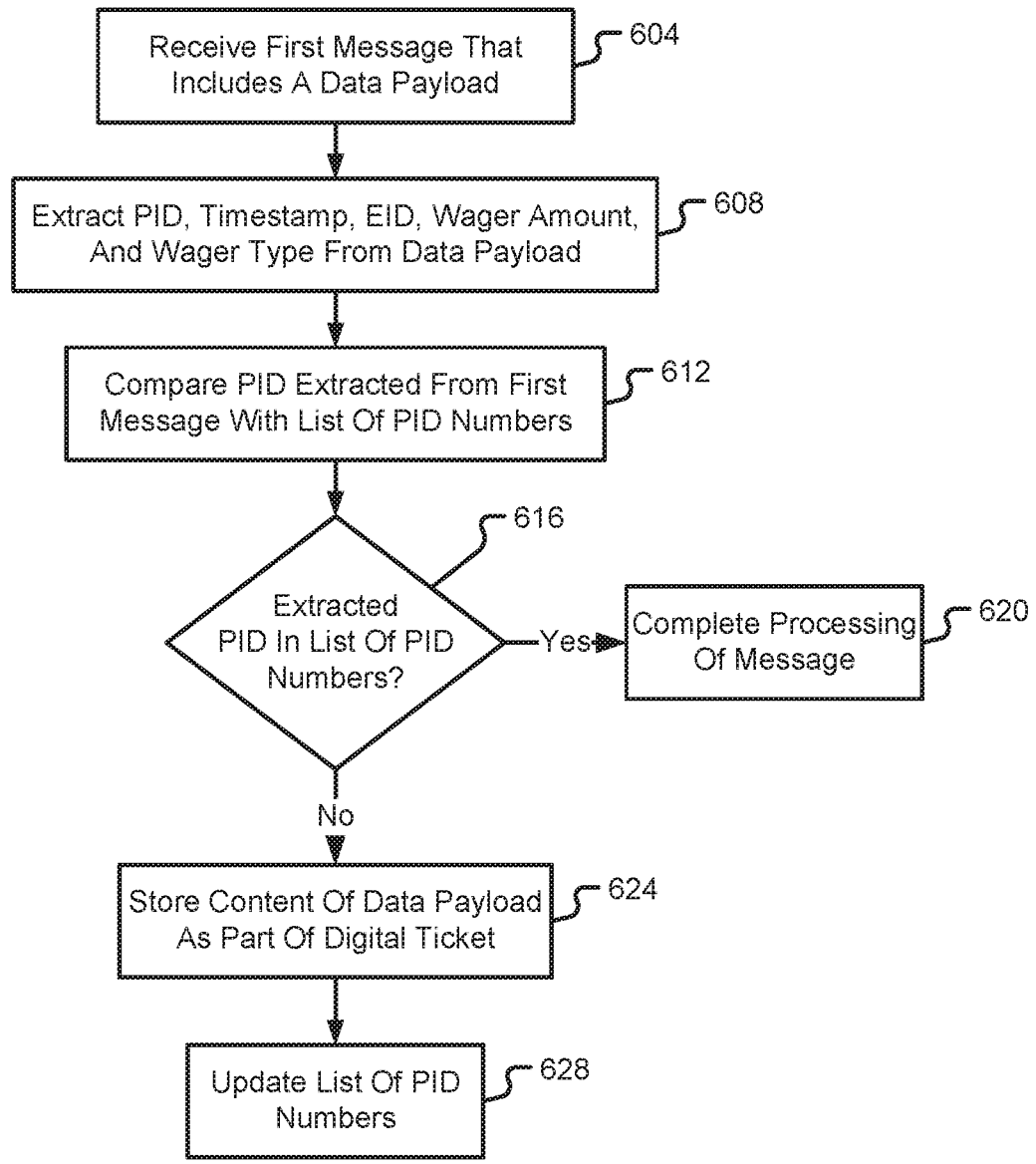
FIG. 6 is a flow diagram depicting a second method in accordance with embodiments of the present disclosure.

With reference now to FIG. 6, another method will be described in accordance with at least some embodiments of the present disclosure. The method begins by receiving a first message at a digital ticket management server 116, where the first message includes a data payload (step 604). In some embodiments, the data payload included in the first message may include the PID number representing a substantially unique identifier assigned to the ticket, a timestamp or date/time information associated with a time that the ticket was produced, an EID number representing an event on which a wager was placed, a wager type, and a wager amount associated with the wager. This information may be encapsulated in one or multiple packets transmitted to the digital ticket management server 116 via the communication network 104. Specifically, the device that issued the ticket for the player 164 or that ingested the ticket (either by ingesting a physical ticket or an electronic ticket) may provide the first message to the digital ticket management server 116.

The method continues with the digital ticket ingesting instruction set 132 extracting the relevant data from the data payload (step 608). The extracted data may then be provided to the digital ticket management instruction set 136, which compares the PID extracted from the first message with the list of PIDs stored in the digital ticket database 144 (step 612). In some embodiments, the PID extracted from the first message is compared with the list of active PIDs 168 to determine if the ticket has already been previously received and stored. In some embodiments, the PID extracted from the first message is compared with the list of inactive PIDs 168 to determine if the ticket was previously received and stored and then subsequently marked as inactive (e.g., due to a redemption of the ticket).

Depending upon whether the PID extracted from the first message is in the list of PID numbers (step 616), the method will continue either with the digital ticket management server 116 completing processing of the message and performing no further work in connection with the ticket (step 620) or with the digital ticket management server 116 invoking the digital ticket management instruction set 136 to store content of the data payload as part of the digital ticket (step 624). In some embodiments, if the PID extracted from the first message is not included in the list of PID numbers already represented in the digital ticket database 144 or a similar memory device storing a data structure 200, then the digital ticket management instruction set 136 may cause the contents of the data payload to be stored as part of a digital representation of the ticket in step 624 and this process may include invoking the database management instruction set 140. Part of this process may also include updating the list of PID numbers to reflect that the new PID extracted from the first message is now part of the list of active PIDs 168 (step 628).

Figure 7:
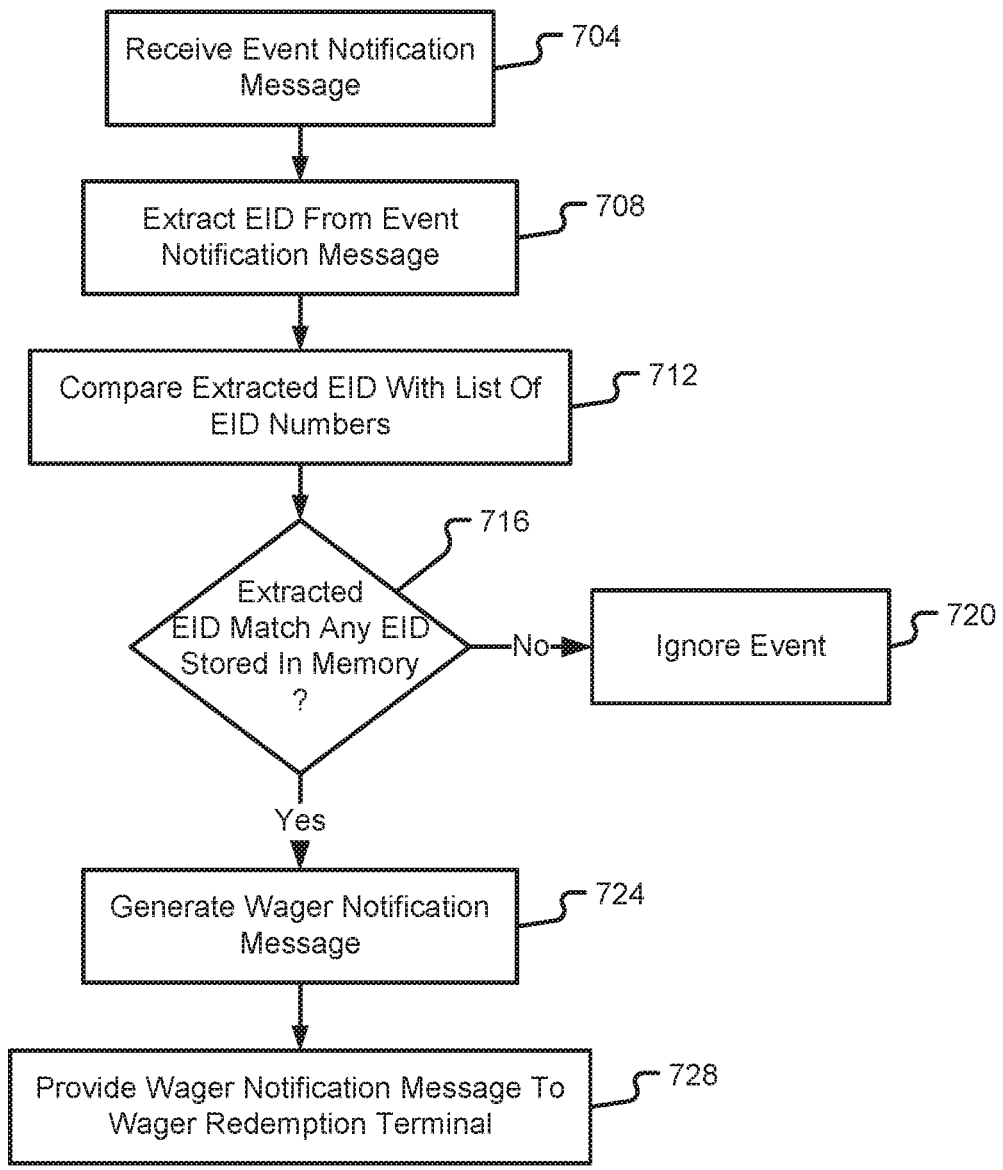
FIG. 7 is a flow diagram depicting a third method in accordance with embodiments of the present disclosure.

With reference now to FIG. 7, another method will be described in accordance with at least some embodiments of the present disclosure. The method begins when an event notification message is received (step 704). The event notification message may correspond to a message generated and transmitted by the game management server 148 in response to determining that an event has produced an outcome that impacts a wager placed on the event (e.g., a game has concluded, a race has concluded, etc.). The event notification message may be transmitted to the gaming device 300 at which an impacted wager was placed, the gaming device 300 at which the impacted wager was placed, the player's 164 mobile device 160, the digital ticket management server 116, a gaming device 300 at which the player 164 is detected, or a combination thereof. In some embodiments, the event notification message may be broadcast and any device that is subscribing to broadcasts by the game management server 148 may receive the event notification message in step 704.

The method continues with the recipient of the event notification message (e.g., gaming machine 108, wager terminal 112, mobile device 160, and/or digital ticket management server 116) extracting the EID from the event notification message (step 708) and then comparing the EID extracted from the event notification message with EIDs associated with an active ticket (step 712).

The digital ticket management instruction set 136 of the recipient device may then determine, based on the comparison, whether the extracted EID matches any EID already stored in memory and, therefore, associated with a ticket issued in connection with a wager for the event identified by the EID (step 716). If the query of step 716 is answered negatively, then the event is ignored and no further processing is performed (step 720).

However, if the query of step 716 is answered affirmatively, then the method continues with the recipient device generating a wager notification message (step 724). The wager notification message may include information describing the event outcome as provided by the event notification message as well as an outcome of the wager placed on the event. The wager notification message may also include information associated with the ticket associated with the EID such as a PID number of the ticket and any other information that was included in a data payload stored for the digital ticket.

The wager notification message may then be transmitted to one or multiple different devices, depending upon the nature of the ticket, a presence of the player 164, and other considerations (step 728). In some embodiments, the wager notification message may be transmitted to a node that will facilitate the player's 164 redemption of the ticket. The node that facilitates such an action may be referred to as a wager redemption terminal and the wager redemption terminal may include a gaming machine 108, a wager terminal 112, the player's 160 mobile device 164, a gaming device 300, or the like. In some embodiments, the mobile device 164 may be provided with instructions for redeeming the ticket, whether such redemption is possible on the mobile device 164 or must be performed at a gaming device 300. In some embodiments, the device that transmit the wager notification message may attempt to determine a current presence of the player 164 (e.g., determine if the player 164 is playing a particular gaming machine 108 or is carrying their mobile device 160) and the wager notification message may be targeted to an appropriate device based on the current presence of the player 164.

Figure 8:
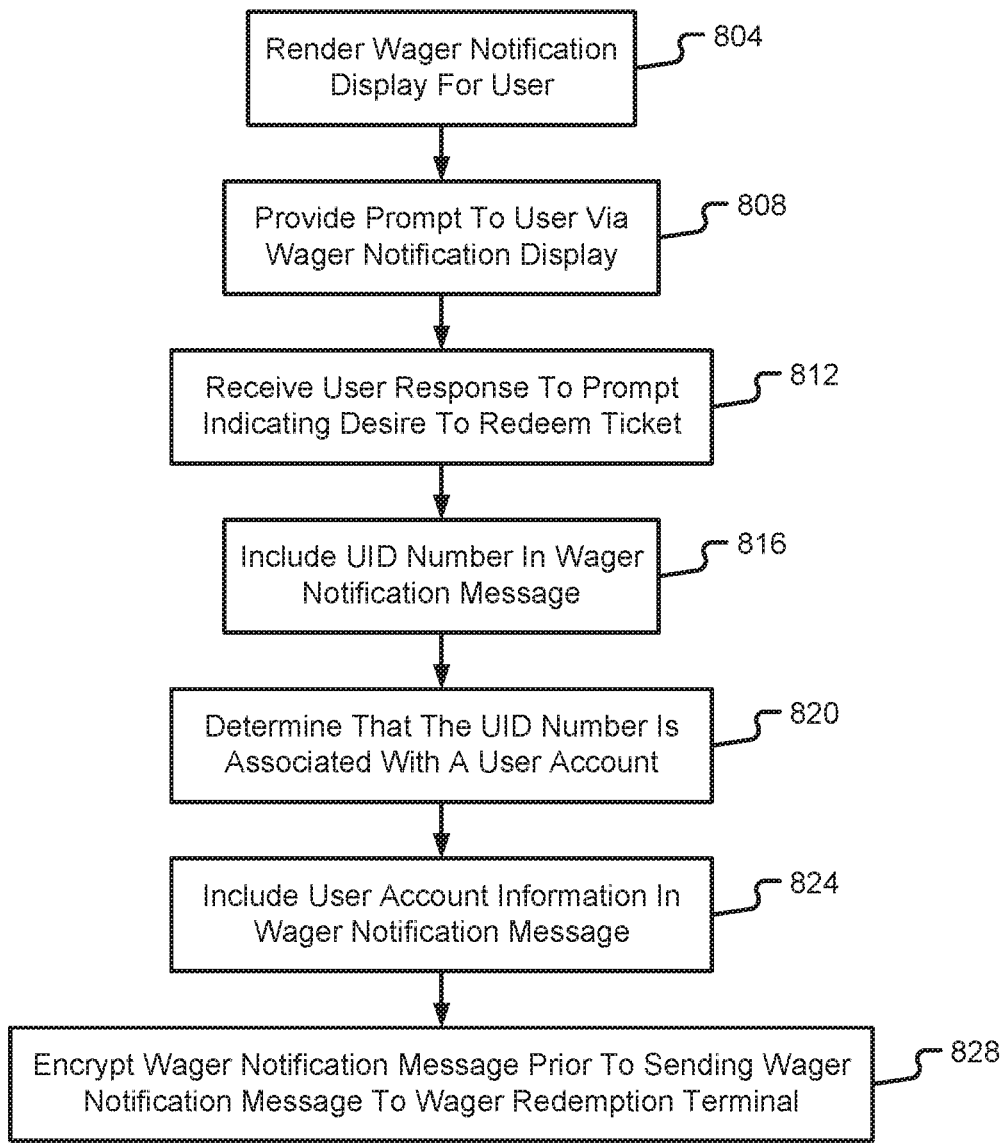
FIG. 8 is a flow diagram depicting a fourth method in accordance with embodiments of the present disclosure.

Referring now to FIG. 8, details of another method will be described in accordance with at least some embodiments of the present disclosure. The method begins when a wager notification message is received at a wager redemption terminal and, in response thereto, the wager redemption terminal renders a wager notification display for the player 164 (step 804). In some embodiments, the wager redemption terminal may correspond to the player's 164 mobile device 160. In some embodiments, the wager redemption terminal may correspond to a gaming machine 108 or a wager terminal 112 in front of which the player 164 is currently standing. The wager notification display may be rendered by a user interface 424 of the mobile device 160 and/or by a user interface 316 of some other gaming device 300.

In some embodiments, the wager notification display provides the player 164 with a prompt (step 808). The prompt may include a prompt for the player 164 to indicate whether or not the player 164 desires to currently redeem the ticket, which may have its associated information displayed via the wager notification display. The method will continue with the player's 164 response to the prompt is received indicating the player's 164 desire to redeem the ticket (step 812). If no response is received or a negative response is received, then no further processing in connection with ticket redemption may be required at that point in time.

The method may then continue with the device that receives the player's 164 input generating a wager notification message that includes a Unique Identification (UID) number that may be associated with the player 164 or with a device being used by the player (step 816). Alternatively, the information regarding the player's 164 response to the prompt and desire to redeem the ticket may be transmitted across the communication network 104 to the device that generates the wager notification message as described in connection with step 724 of FIG. 7. This device may correspond to the game management server 148 and/or digital ticket management server 116. In this particular embodiment where the game management server 148 and/or digital ticket management server 116 generates the wager notification message, the content used for the wager notification display may be communicated from the appropriate server 116, 148 to the device at which the player 164 is positioned and then the response of the player 164 may be communicated back to the server 116, 148 via the communication network 104.

If the wager notification message is being generated to include a UID number, then it may be desirable to determine whether or not the UID number is associated with a particular user account and, therefore, whether privacy concerns should be addressed (step 820). If the UID number is determined to be associated with a particular user account (e.g., a player 164 loyalty account, bank account, financial account, user account, etc.), then the device generating the wager notification message may include the account information in the wager notification message (step 824) and encrypt the wager notification message prior to sending the wager notification message across the communication network 104 (step 828). In some embodiments, the recipient of the encrypted wager notification message may comprise the appropriate encryption/decryption key pairs to decrypt the wager notification message and present appropriate information to the player 164. For instance, the player 164 may be presented with information indicating that the ticket has been redeemed and may further indicate the account to which the redemption value of the ticket has been placed. The use of wager notification messages in this way enables the player 164 to remote redeem a ticket that is being managed at their mobile device 164 and/or by the digital ticket management server 116.

Figure 9:
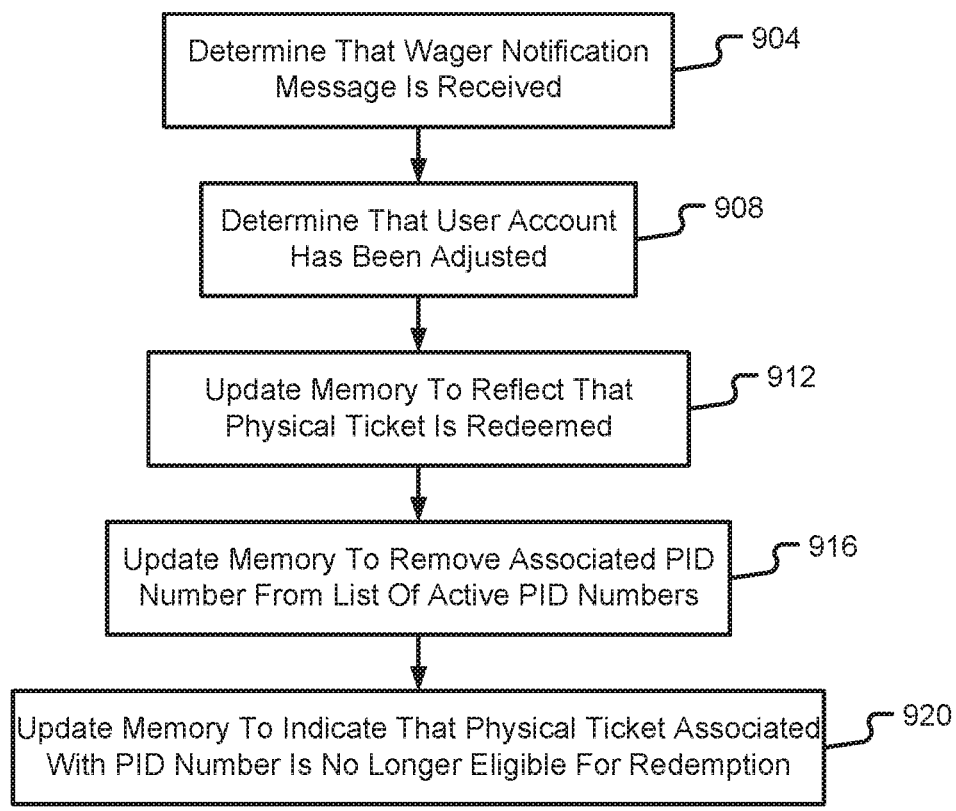
FIG. 9 is a flow diagram depicting a fifth method in accordance with embodiments of the present disclosure.

Referring now to FIG. 9, details of still another method will be described in accordance with at least some embodiments of the present disclosure. The method begins with a determination that a wager notification message has been received by a target device of the wager notification message (step 904). The determination may be performed at any device in the system 100 and the determination that the wager notification message is received may be based on an acknowledgement message being transmitted by the recipient of the wager notification message back to the sender of the wager notification message. Alternatively or additionally, an interested device may submit a request for another device to send a status message when that particular device receives a wager notification message. In some embodiments, the device that determines the wager notification message is received correspond to the digital ticket management server 116 and the wager notification message may be received by any of gaming device 300 depicted and described herein (e.g., the gaming machine 108, wager terminal 112, and/or mobile device 160).

The method may then continue by determining that the player's 164 account has been appropriate adjusted to reflect a redemption of a ticket, possibly a ticket identified in the wager notification message (step 908). The payout reconciliation instruction set 156 may be responsible for reconciling player accounts based on ticket redemption, but when the payout reconciliation instruction set 156 makes such an account reconciliation based on a ticket redemption, the game management server 148 may notify the digital ticket management server 116 that the user account has been adjusted.

When the digital ticket management server 116 determines that the player's 164 account has been updated to reflect the redemption of a ticket, the method continues with the digital ticket management instruction set 136 updating appropriate memory devices to reflect that the physical ticket is redeemed (step 912). The update may be performed within the digital ticket database 144 or in any other memory device storing the data structure 200 and having the active/inactive status field 220 for the now-redeemed ticket.

The update may also include removing or marking any PID numbers associated with the redeemed ticket as inactive (step 916), thereby indicating that any other tickets (electronic or physical) associated with the PID number is no longer eligible for redemption (step 920). In some embodiments, the update to memory may include adjusting the value of the active/inactive status field 220 for the associated PID number to reflect that the ticket is inactive. Alternatively or additionally, the list of active PIDs 168 and/or list of inactive PIDs 172 may be updated to include or not include the PID number associated with the redeemed ticket as appropriate.

Figure 10:
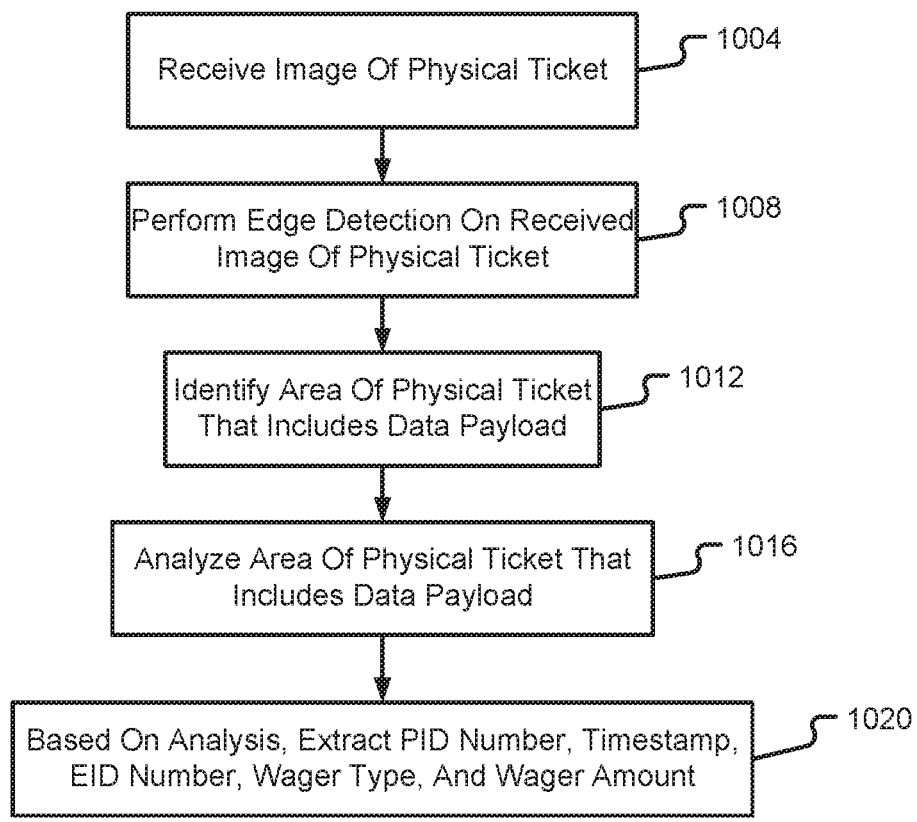
FIG. 10 is a flow diagram depicting a sixth method in accordance with embodiments of the present disclosure.

Referring now to FIG. 10, details of another method will be described in accordance with at least some embodiments of the present disclosure. The method begins with a mobile device 160 capturing an image of a physical ticket that was previously issued/printed for a player 164 in connection with a wager placed by the player on an event. The image may be captured using an image capture device 424 of the mobile device 160. The digital information for the image (e.g., an image file, pixel information, etc.) may be provided from the image capture device 424 to the processor 404 (step 1004). Upon receiving the image of the physical ticket, but in electronic form, the processor 404 may invoke the digital ticket management instruction set 136 to perform an edge detection process on the image of the physical ticket (step 1008). It should be appreciated that this edge detection process may alternatively or additionally be performed by the digital ticket ingestion instruction set 132 of the digital ticket management server 116 upon receiving the image of the physical ticket from the mobile device 160 or from another other device capable of providing the image.

The method then continues, based on the edge detection process, by identifying an area of the physical ticket that includes a data payload (step 1012). Identification of an area of the physical ticket that includes the data payload may include searching for particular key features (e.g., embedded features of the ticket that identify boundaries of such an area), searching for the data payload having a predetermined format (e.g., searching for keywords or images), or performing any other type of image processing technique used to identify areas of interest in an image.

The identified area of the image may then be further analyzed to extract the desired data payload (step 1016). The data payload extracted in this step may include the PID number representing a substantially unique identifier assigned to the ticket, a timestamp or date/time information associated with a time that the ticket was produced, an EID number representing an event on which a wager was placed, a wager type, and a wager amount associated with the wager. Each type of data or information may be identified automatically by searching for particular data formats, string length, character types, or any other feature that might be particular to the data.

Based on the analysis, the method then continues by extracting the PID number, timestamp, EID number, wager type, and wager amount from the data payload (step 1020). This extracted information can then be stored as part of a digital ticket, if the digital ticket is not already stored in the data structure 200 that would otherwise be updated with the data payload.

Figure 11:
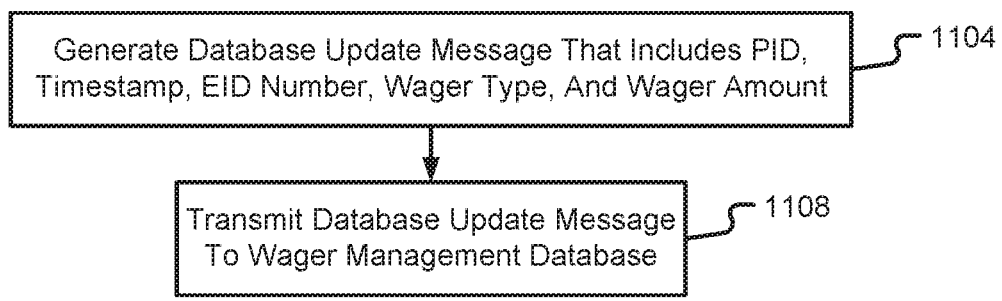
FIG. 11 is a flow diagram depicting a seventh method in accordance with embodiments of the present disclosure.

With reference now to FIG. 11, details of another method will be described in accordance with at least some embodiments of the present disclosure. The method begins with the database management instruction set 140 generating a database update message that includes the PID, timestamp, EID number, wager type, and wager amount (step 1104). This information may correspond to information provided to the database management instruction set 140 by the digital ticket management instruction set 136. Such information may have been extracted as a data payload from a message and already determined to not be represented within the digital ticket database 144.

The database management instruction set 140 may then transmit the database update message to a device that manages updates to a wager management database 176 (step 1108). In some embodiments, the database update message may be transmitted from the digital ticket management server 116 to the game management server 148 to impact the update to the wager management database 176. Alternatively, the message may be transmitted internally within a single server if a single server is performing the functions of the digital ticket management server 116 and game management server 148.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention is claimed as follows:

1. A method of storing and managing digital records, the method comprising:
    receiving, at a processor, a message that comprises a data payload, wherein the data payload comprises a physical ticket identification (PID) number representing a substantially unique identifier assigned to a physical ticket, a timestamp associated with a time at which the physical ticket was produced, an event identification (EID) number representing an event on which a wager has been placed, and a wager description field that describes both a wager type and a wager amount associated with the wager;
    comparing, with the processor, the PID number with an electronic record comprising a list of PID numbers already stored in memory;
    determining, with the processor, that the electronic record comprising the list of PID numbers does not comprise the PID number;
    in response to determining that the electronic record comprising the list of PID numbers does not comprise the PID number, causing, with the processor, the data payload to be stored in the memory;
    updating, with the processor, the electronic record comprising the list of PID numbers to comprise the PID number;
    receiving, at the processor, an event notification message that comprises an EID field;
    comparing, with the processor, a value obtained from the EID field with the EID number stored in memory as part of the data payload;
    determining, with the processor, that the value obtained from the EID field matches the EID number stored in memory; and
    in response to determining that the value obtained from the EID field matches the EID number stored in memory, providing, with the processor, a wager notification message to a wager redemption terminal, wherein the wager notification message comprises the PID number, the timestamp, the EID number, the wager type associated with the wager, and the wager amount associated with the wager.

2. The method of claim 1, wherein the processor and memory are provided in a mobile communication device, the method further comprising:
    rendering, at a user interface of a mobile communication device, a wager notification display that comprises the PID number, the timestamp, the EID number, the wager type associated with the wager, and the wager amount associated with the wager, wherein the wager notification display further comprises a prompt for a user requesting whether or not the user desires to redeem the physical ticket;
    receiving, at the processor, a response to the prompt indicating that the user desires to redeem the physical ticket; and
    including, within the wager notification message, a user identification (UID) number that is associated with the user.

3. The method of claim 2, further comprising:
    determining, with the processor, that the UID number is associated with a user account comprising a predetermined account number;
    including, within the wager notification message, the predetermined account number; and
    encrypting, with the processor, the wager notification message prior to providing the wager notification message to the wager redemption terminal.

4. The method of claim 3, further comprising:
    determining, with the processor, that the wager notification message has been received at the wager redemption terminal;
    determining, with the processor, that an electronic record in the user account has been adjusted based on the wager amount; and
    in response to determining that the electronic record in the user account has been adjusted based on the wager amount, updating the memory to reflect that the physical ticket has been redeemed.

5. The method of claim 4, wherein the list of PID numbers comprises a listing of PID numbers associated with unredeemed physical tickets, the method further comprising:

updating, with the processor, the memory to remove the PID number from the list of PID numbers; and updating, with the processor, the memory to indicate that the physical ticket associated with the PID number is no longer eligible for redemption.

6. The method of claim 1, wherein the message that comprises the data payload is received from an image capture device as an image of the physical ticket, the method further comprising:

performing, with the processor, an edge detection process on the image of the physical ticket;

identifying, with the processor and based on the edge detection process, an area of the physical ticket that comprises the data payload printed thereon; and extracting, with the processor and from the area of the physical ticket, the PID number, the timestamp, the EID number, the wager type, and the wager amount.

7. The method of claim 6, wherein the area of the physical ticket that comprises the data payload printed thereon comprises an optical code that is encoded with the data payload, the method further comprising:

decoding, with the processor, the optical code to obtain the PID number, the timestamp, the EID number, the wager type, and the wager amount.

8. The method of claim 6, wherein the area of the physical ticket that comprises the data payload printed thereon comprises the PID number, the timestamp, the EID number, the wager type, and the wager amount printed in text, the method further comprising:

performing, with the processor, text recognition on the area of the physical ticket to retrieve the PID number, the timestamp, the EID number, the wager type, and the wager amount.

9. The method of claim 1, further comprising:

establishing, with a wireless communication interface, a proximity-based communication channel with the wager redemption terminal;

authenticating, with the processor, the wager redemption terminal; and using the proximity-based communication channel to provide the wager notification message to the wager redemption terminal.

10. The method of claim 1, further comprising:

generating, with the processor and in response to updating the electronic record comprising the list of PID numbers, a database update message that comprises the PID number, the timestamp, the EID number, the wager type associated with the wager, and the wager amount associated with the wager; and transmitting the database update message, via a communication network, to a wager management database for storage in the wager management database.

11. A system for storing digital records, comprising:

a communication interface;

a processor coupled with the communication interface; and a computer-readable storage medium, coupled with the processor, comprising instructions that are executable by the processor, wherein the instructions comprise:

instructions that receive, via the communication interface, a message that comprises a data payload, wherein the data payload comprises a physical ticket identification (PID) number representing a substantially unique identifier assigned to a physical ticket, a timestamp associated with a time at which the physical ticket was produced, an event identification (EID) number representing an event on which a wager has been placed, a wager type associated with the wager, and a wager amount associated with the wager;

instructions that compare the PID number with an electronic record comprising a list of PID numbers representing physical tickets already stored for a user that placed the wager;

instructions that determine whether the electronic record comprising the list of PID numbers comprises the PID number;

instructions that update the electronic record comprising the list of PID numbers to comprise the PID number;

instructions that receive, via the communication interface, an event notification message that comprises an EID field;

instructions that extract a value from the EID field;

instructions that compare the value extracted from the EID field with the EID number and determine that the value extracted from the EID field matches the EID number; and instructions that generate and send, via the communication interface, a wager notification message to a wager redemption terminal in response to determining that the value extracted from the EID field matches the EID number, wherein the wager notification message comprises the PID number, the timestamp, the EID number, the wager type associated with the wager, and the wager amount associated with the wager.

12. The system of claim 11, wherein the instructions further comprise:

instructions that render a wager notification display that comprises the PID number, the timestamp, the EID number, the wager type associated with the wager, and the wager amount associated with the wager, wherein the wager notification display further comprises a prompt for the user requesting whether or not the user desires to redeem the physical ticket;

instructions that receive a response to the prompt indicating that the user desires to redeem the physical ticket; and instructions that comprise, within the wager notification message, a user identification (UID) number that is associated with the user.

13. The system of claim 12, wherein the instructions further comprise:

instructions that determine that the UID number is associated with a user account comprising a predetermined account number;

instructions that comprise, within the wager notification message, the predetermined account number; and instructions that encrypt the wager notification message prior to providing the wager notification message to the wager redemption terminal.

14. The system of claim 13, wherein the instructions further comprise:

instructions that determine that the wager notification message has been received at the wager redemption terminal; and instructions that determine that an electronic record in the user account has been adjusted based on the wager amount.

15. The system of claim 11, wherein the message that comprises the data payload is received from an image capture device as an image of the physical ticket and wherein the instructions further comprise:

instructions that perform an edge detection process on the image of the physical ticket;
instructions that identify, based on the edge detection process, an area of the physical ticket that comprises the data payload printed thereon; and
instructions that extract the PID number, the timestamp, the EID number, the wager type, and the wager amount from the area of the physical ticket.

16. The system of claim 11, wherein the instructions further comprise:
instructions that establish a proximity-based communication channel with the wager redemption terminal; and
instructions that use the proximity-based communication channel to provide the wager notification message to the wager redemption terminal.

17. A mobile device, comprising:
an image capture device;
a communication interface;
a processor coupled with the image capture device and with the communication interface; and
a computer-readable storage medium, coupled with the processor, comprising instructions that are executable by the processor, wherein the instructions comprise:
instructions that receive an image of a physical ticket from the image capture device;
instructions that analyze the image of the physical ticket to determine a data payload for the physical ticket, wherein the data payload comprises a physical ticket identification (PID) number representing a substantially unique identifier assigned to a physical ticket, a timestamp associated with a time at which the physical ticket was produced, an event identification (EID) number representing an event on which a wager has been placed, a wager type associated with the wager, and a wager amount associated with the wager;
instructions that compare the PID number with an electronic record comprising a list of PID numbers representing physical tickets already stored for a user of the mobile communication device;
instructions that determine whether the electronic record comprising the list of PID numbers comprises the PID number;
instructions that update the electronic record comprising the list of PID numbers to comprise the PID number;
instructions that receive, via the communication interface, an event notification message that comprises an EID field;
instructions that extract a value from the EID field;
instructions that compare the value extracted from the EID field with the EID number and determine that the value extracted from the EID field matches the EID number; and
instructions that generate and send, via the communication interface, a wager notification message to a wager redemption terminal in response to determining that the value extracted from the EID field matches the EID number, wherein the wager notification message comprises the PID number, the timestamp, the EID number, the wager type associated with the wager, and the wager amount associated with the wager.

18. The mobile device of claim 17, wherein the instructions further comprise:
instructions that render a wager notification display via a user interface, wherein the wager notification display comprises the PID number, the timestamp, the EID number, the wager type associated with the wager, and the wager amount associated with the wager, and wherein the wager notification display further comprises a prompt for the user requesting whether or not the user desires to redeem the physical ticket;
instructions that receive a response to the prompt indicating that the user desires to redeem the physical ticket; and
instructions that comprise, within the wager notification message, a user identification (UID) number that is associated with the user.

19. The mobile device of claim 17, wherein the instructions further comprise:
instructions that perform an edge detection process on the image of the physical ticket;
instructions that identify, based on the edge detection process, an area of the physical ticket that comprises the data payload printed thereon; and
instructions that extract the PID number, the timestamp, the EID number, the wager type, and the wager amount from the area of the physical ticket.

20. The mobile device of claim 19, wherein the area of the physical ticket that comprises that data payload printed thereon comprises an optical code that is encoded with the data payload and wherein the instructions further comprise:
instructions that decode the optical code to obtain the PID number, the timestamp, the EID number, the wager type, and the wager amount.

* * * * *